United States Patent [19]

Cogswell, II et al.

[11] 4,403,762
[45] Sep. 13, 1983

[54] LOW FORCE TRANSMISSIBILITY MOUNT

[75] Inventors: James A. Cogswell, II, Clarkston; Donald E. Malen, Lathrup Village, both of Mich.

[73] Assignee: General Motors Corporation, Detroit, Mich.

[21] Appl. No.: 236,335

[22] Filed: Feb. 20, 1981

[51] Int. Cl.³ ............................................. F16M 13/00
[52] U.S. Cl. .................................... 248/559; 248/638; 248/659
[58] Field of Search ............... 248/559, 636, 638, 659, 248/621, 562, 563; 180/902, 312, 291; 267/152, 151

[56] References Cited

U.S. PATENT DOCUMENTS

| | | | |
|---|---|---|---|
| 1,731,540 | 10/1929 | Powell | 248/659 |
| 1,766,925 | 6/1930 | Moorhouse | 180/291 |
| 3,018,990 | 1/1962 | Muller | 248/605 |
| 3,091,103 | 5/1963 | Goodwin | 248/631 X |
| 3,445,080 | 5/1969 | Flannelly | 267/140.1 |
| 3,667,706 | 6/1972 | Tiberghien | 248/559 |
| 3,730,462 | 5/1973 | Dick | 248/659 UX |

FOREIGN PATENT DOCUMENTS

| | | | |
|---|---|---|---|
| 38532 | 10/1981 | European Pat. Off. | 180/291 |
| 39823 | 11/1981 | European Pat. Off. | 180/291 |
| 40327 | 11/1981 | European Pat. Off. | 180/291 |
| 2722500 | 2/1978 | Fed. Rep. of Germany | 248/605 |
| 2444852 | 8/1980 | France | 180/312 |
| 701616 | 12/1953 | United Kingdom | 180/291 |

Primary Examiner—J. Franklin Foss
Attorney, Agent, or Firm—R. L. Phillips

[57] ABSTRACT

A mount is disclosed mounting an internal combustion engine in a unitized vehicle body. The mount comprises an intermediate mass which is independent of the vehicle structure and the powertrain and is adapted to be frequency tuned. Separate elastomeric bodies couple the intermediate mass to the vehicle structure and to the powertrain and the intermediate mass is predetermined in combination with the elastomeric characteristics of the coupling bodies so as to resonate at a frequency within an uncoupled intermediate frequency range such that the transmissibility of the mount is attenuated substantially throughout a high frequency range to reduce vehicle structure noise caused by the engine's combustion process while satisfying other transmissibility criteria at the lower frequencies. In another embodiment, a portion of the intermediate mass is isolated and sprung from the remainder and the resonant intermediate mass frequencies are tuned to have substantially different peaks to further reduce the magnitude of the transmitted force at resonance while still attenuating the high frequency engine combustion caused vibrations.

3 Claims, 26 Drawing Figures

LOWER FREQUENCY TRANSMISSIBILITY RATIO

UPPER FREQUENCY TRANSMISSIBILITY RATIO

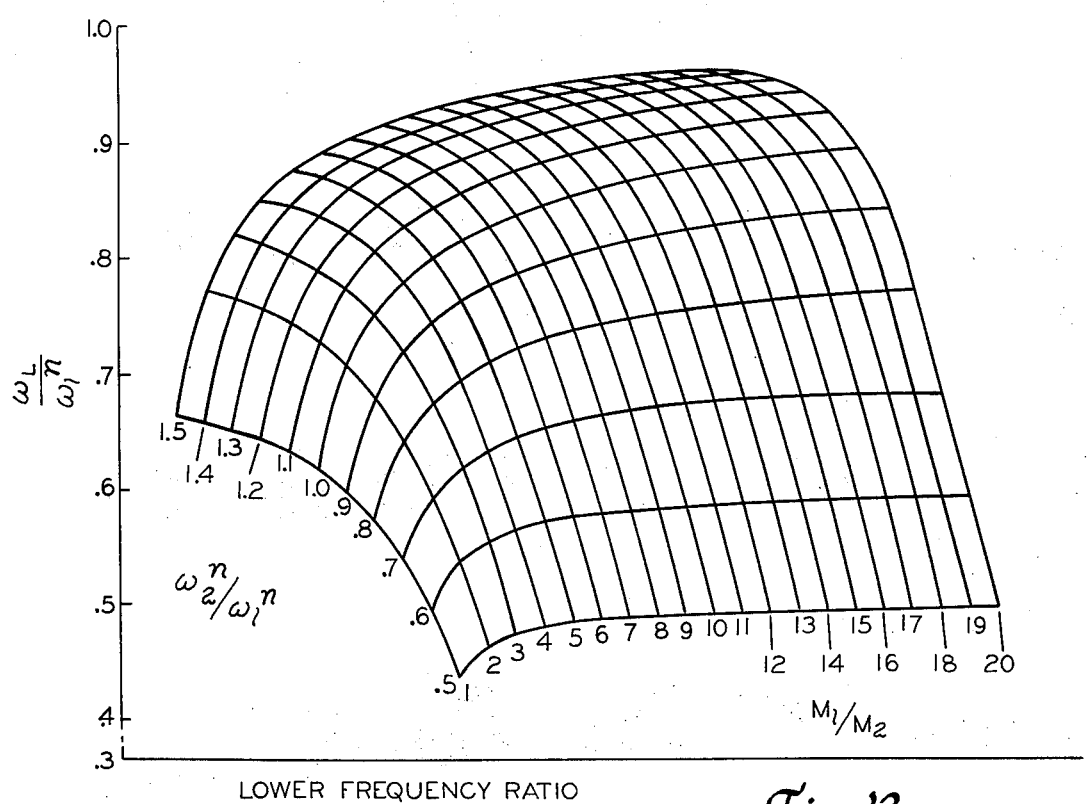
Fig. 12 LOWER FREQUENCY RATIO
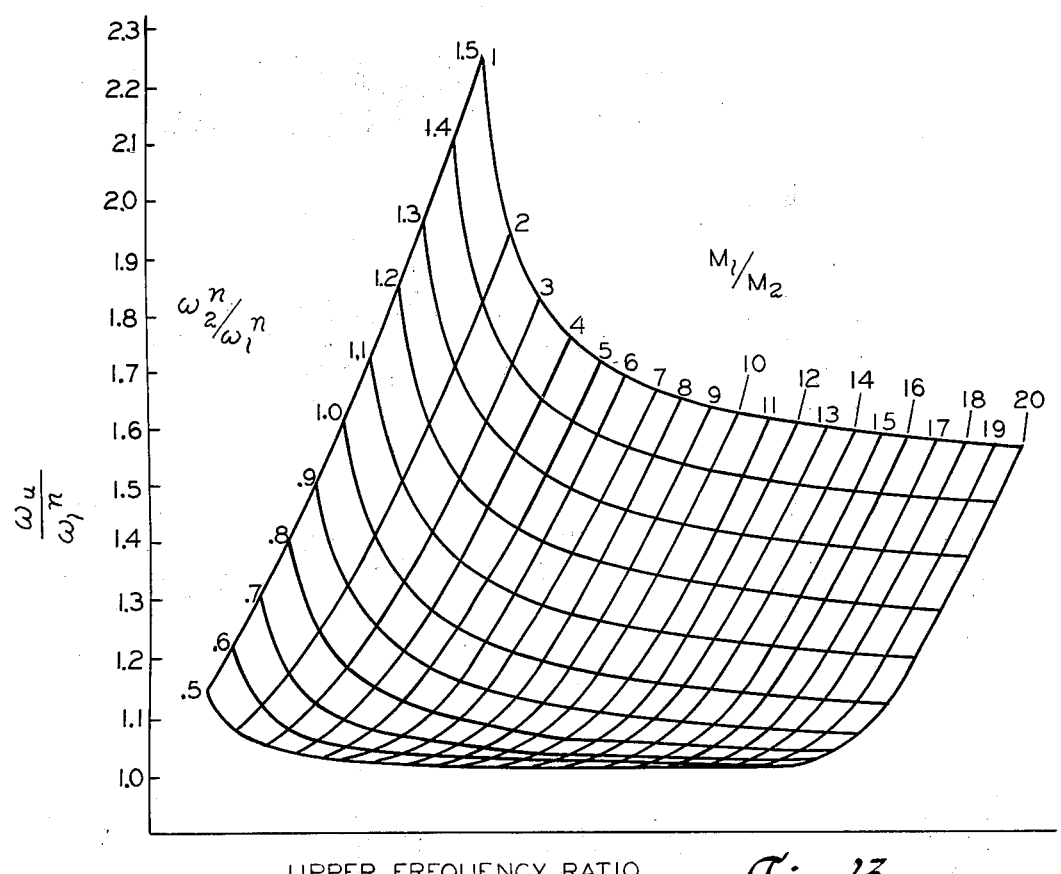
Fig. 13 UPPER FREQUENCY RATIO

LOW FORCE TRANSMISSIBILITY MOUNT

This invention relates to low force transmissibility mounts and more particularly to low force transmissibility powertrain mounts for mounting an internal combustion engine in a unitized vehicle structure.

In a vehicle powered by an internal combustion engine, it is well known that the fuel economy can be improved by reducing vehicle mass through the efficient use of its construction material and that this can be accomplished to a considerable degree with an integral or unitized body-frame structure. In such a vehicle design, sufficient strength is given to the unitized body-frame to allow both the suspension and engine to be attached directly thereto through mounts. This is to be distinguished from separate body and frame design where the suspension, powertrain and body are attached through separate mounts to the frame. In the absence of a softly mounted frame or engine cradle, certain vibration forces from the powertrain may travel through the powertrain mounts, excite the vehicle body structure and cause an objectionable level of noise in the passenger compartment. In that case, there is a need to attenuate such powertrain caused structural noise to take full advantage of the mass reduction potential available with an integral vehicle body-frame which will hereinafter be simply referred to as a unitized vehicle structure.

However, it has been found that because of the peculiar vibration problems encountered, conventional powertrain mounts do not readily lend themselves for tuning that would provide the desired vibration isolation or attenuation, i.e. force transmissibility. In particular, it has been discovered that the vibration disturbances are not necessarily engine speed order related, but are associated with the loading nature of the combustion process. These combustion impulses, over and above the normally expected engine vibration forces and above a certain high frequency past the acoustically sensitive unitized vehicle structure modes, have been found to excite the powertrain resonances which in turn deflect the powertrain mounts and cause a high frequency force to be transmitted into the unitized vehicle structure. The structure responds to this force in the form of panel deflection producing objectionable noise in the passenger compartment. For example, investigation has shown that in a prototype unitized vehicle structure of minimum weight and believed to be typical of current state of the art design, an engine rapping noise occurred under driving acceleration using conventional mounts. This noise was clearly found to be sensitive to the rate of fuel combustion and further tests showed the sound to be in the 300–1600 Hz range.

In conventional powertrain mounts, there is normally a direct elastomeric coupling between the powertrain and supporting vehicle structure which may or may not include rate plates or other means of rate or stiffness control and when a powertrain deflection is imposed on one side there is produced a force on the vehicle structure side. In tests we have conducted to show the measured transmitted force per unit deflection of a powertrain mount as a function of the frequency of excitation, we have observed that with such conventional amounts the magnitude of this force per unit deflection is nearly constant and independent of the frequency with the result that the problemsome high frequency combustion induced deflections of the powertrain definitely transmit a large load into the structure to produce such rapping noise. Through further tests we were able to identify what appears to be the most desirable or acceptable mount transmissibility pattern or criteria wherein there is a low level limit of acceptable transmissibility in a low frequency range, a higher but still limited level of acceptable transmissibility in a low-intermediate frequency range, a relatively unlimited level of acceptable transmissibility in a high-intermediate frequency range and a particularly hard to satisfy lowest level limit of acceptable transmissibility in a high frequency range.

Departing from conventional design, the low force transmissibility mount according to the present invention satisfies such transmissibility requirements and particularly such a difficult one as caused by the combustion process impulses at high frequencies with an improved arrangement wherein there is provided in the mount an intermediate or isolated mass that is independent of both the supporting structure, i.e. the unitized vehicle structure, and the vibratory body, i.e. the powertrain, and is adapted to be frequency tuned. The intermediate mass is isolated with one elastomeric body or coupling that couples it to the unitized vehicle structure and a second elastomeric body or coupling that couples it to the powertrain to complete the supportive powertrain mounting. With such arrangement, the intermediate mass is predetermined in combination with the elastomeric characteristics of the two coupling bodies separated thereby so as to resonate within the acceptably high transmissibility intermediate frequency range such that the force transmissibility of the mount is attenuated to below the lowest level substantially throughout the high frequency range while also remaining below the other transmissibility levels substantially throughout their respective frequency range. Discovering further that in some mount usages it may not be possible to satisfactorily meet all the transmissiblity objectives by varying the suspended intermediate mass and/or the elastomeric coupling characteristics, it was further found that with a simple modification to our basic mount arrangement, it was possible to avoid certain remaining objectionable transmissibility regions. This was accomplished by isolating and springing a portion of the suspended intermediate mass from the remainder and tuning the resonant intermediate mass frequencies so as to reduce the magnitude of the transmitted force sufficiently to avoid the remaining objectionable transmissibility regions while still attenuating the high frequency combustion impulse induced vibrations.

These and other objects and advantages of the present invention will become more apparent from the following description and drawings in which.

Figure 7:
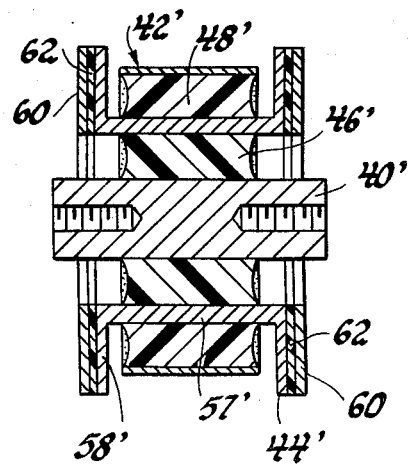
FIG. 7 is a view similar to FIG. 2 showing another or alternative embodiment of the mount according to the present invention wherein a vibration absorber has been added.

FIGS. 10-13 graphically depict variable characteristics of the FIG. 7 mount.

Figure 2:
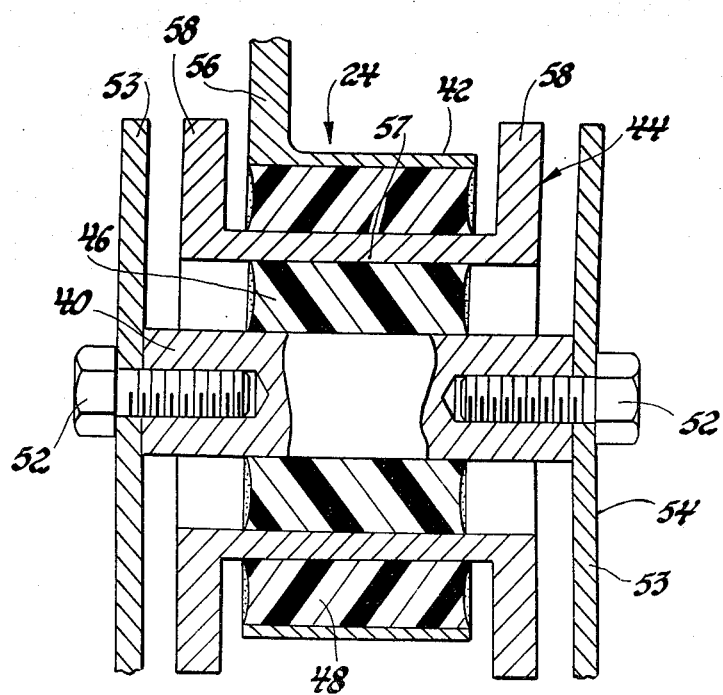
FIG. 2 is an enlarged view of the front mount in FIG. 1 taken along the line 2—2.
Figure 6:
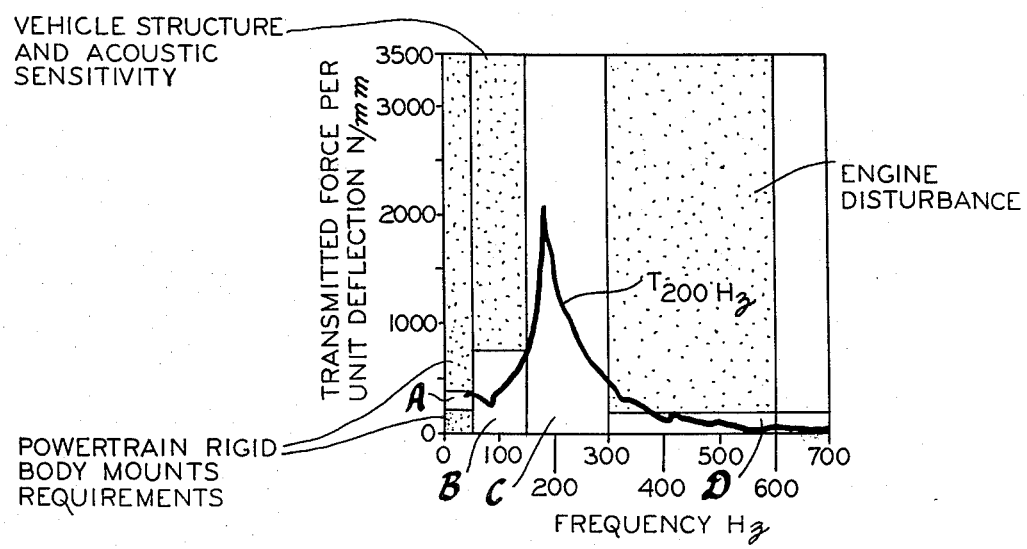
FIG. 6 is a graph showing another example of the predicted nominal force transmissibility characteristics of the mounting arrangement in FIG. 1 with the FIG. 2 mount.
Figure 14:
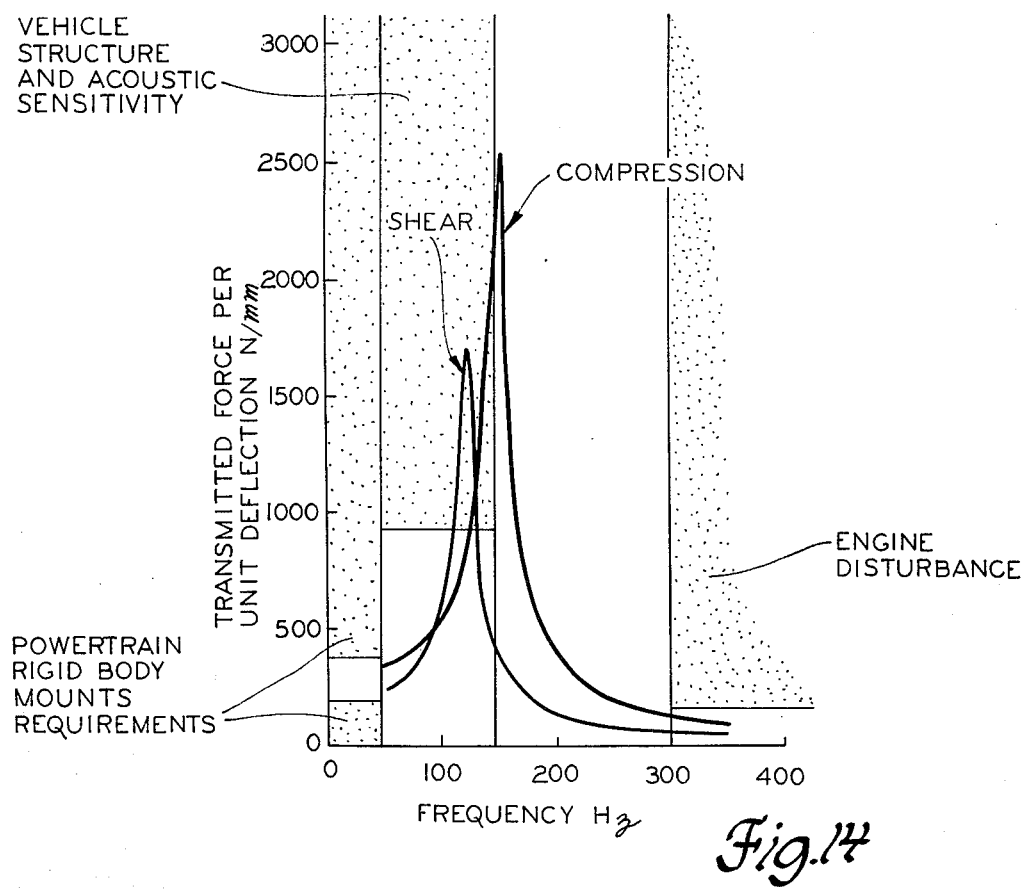

FIG. 14 is a graph showing the predicted force transmissibility characteristics of the FIG. 6 example of the FIG. 2 mount in both the shear and compression directions.

FIGS. 15-21 graphically depict the use of the variable characteristics shown in FIGS. 10-13 for the FIG. 7 mount.

Figure 20:
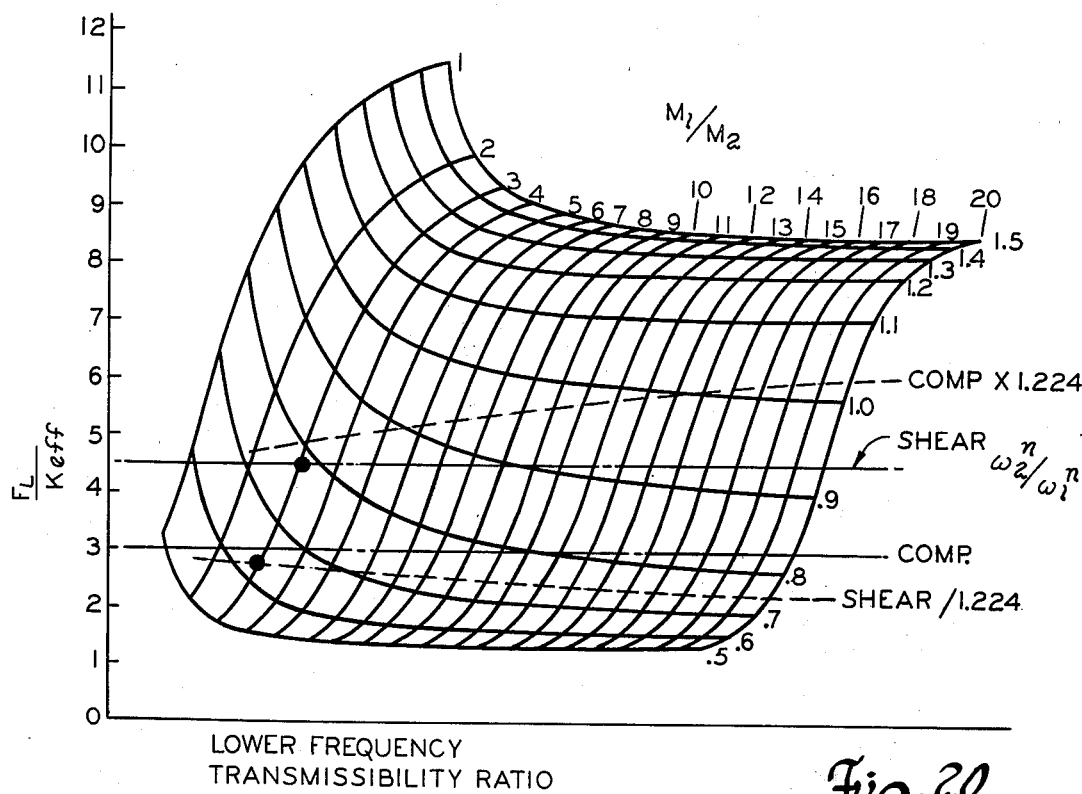
Figure 21:
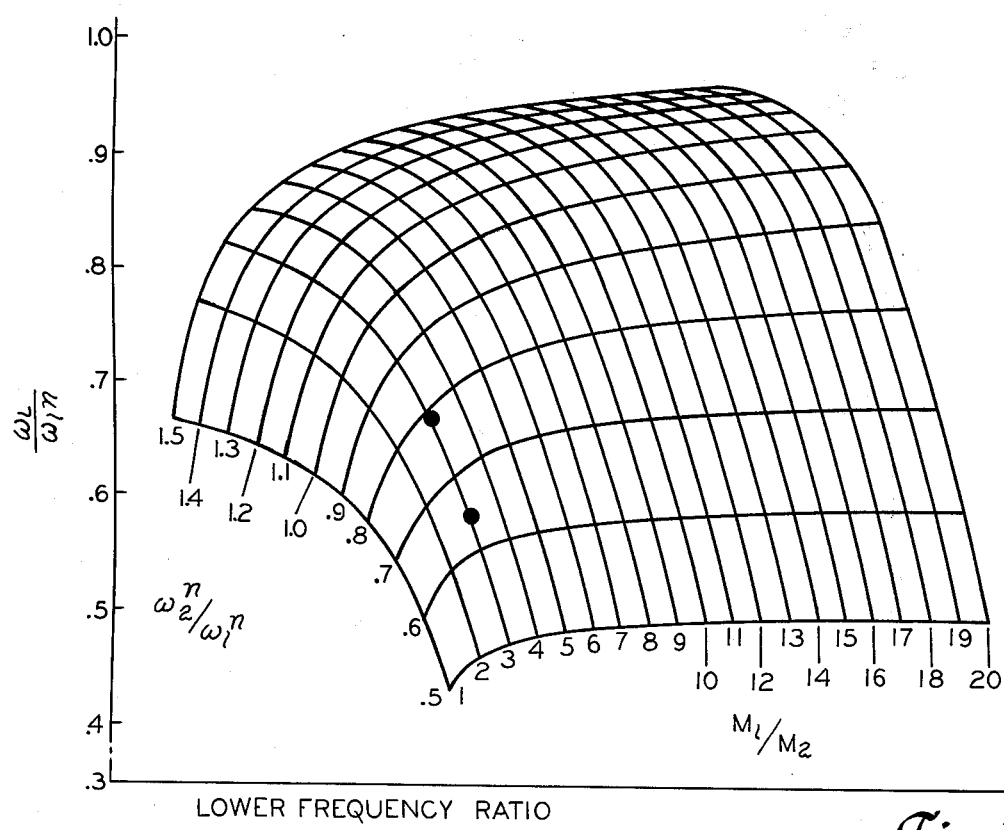
Figure 22:
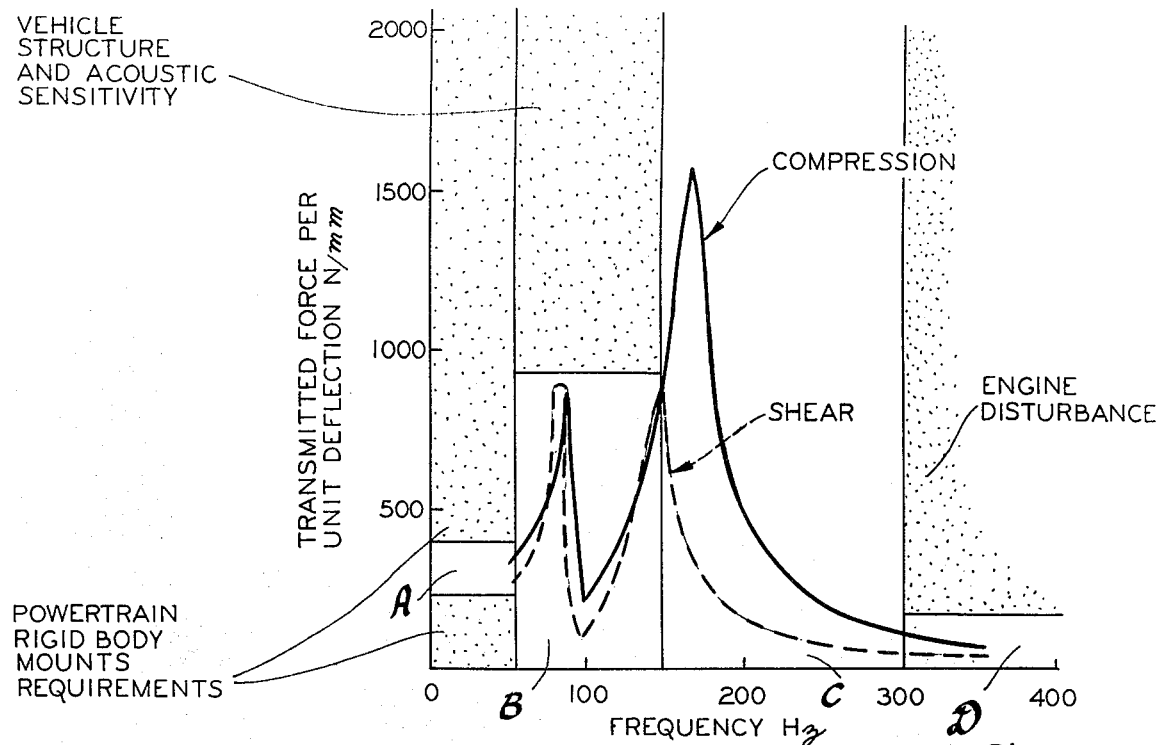

FIG. 22 is a graph showing the predicted force transmissibility characteristics of the FIGS. 15-21 example of the FIG. 7 mount in both the shear and compression directions.

Figure 23:
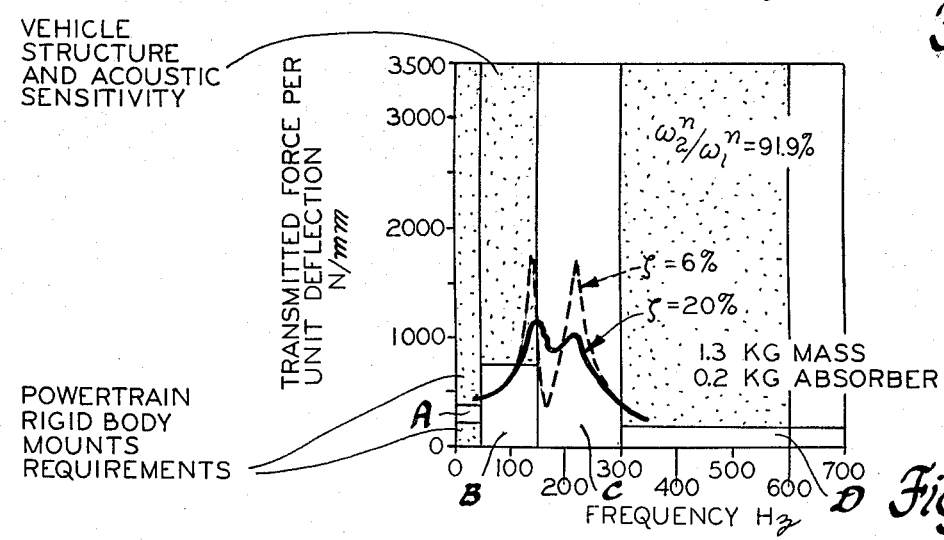

FIG. 23 is a graph depicting typical conventional vibration absorber tuning practice.

Figure 24:
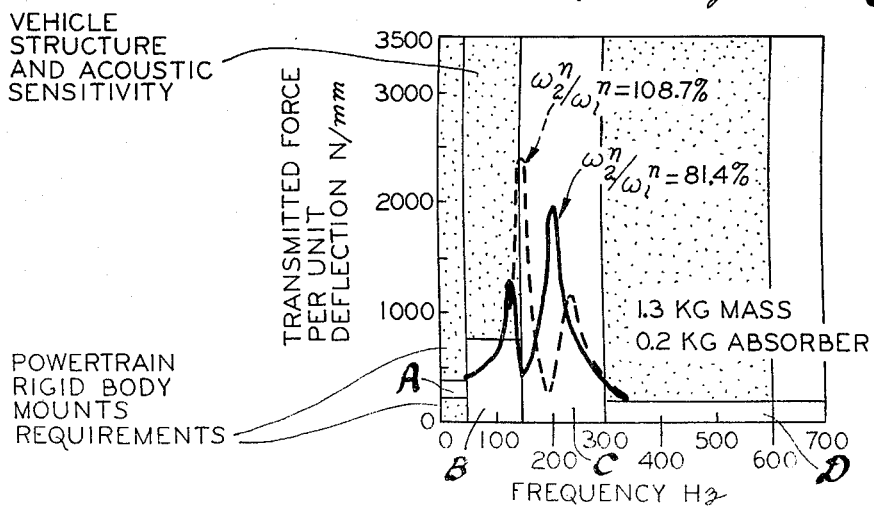

FIG. 24 is a graph depicting absorber tuning practices according to the present invention.

Figure 25:
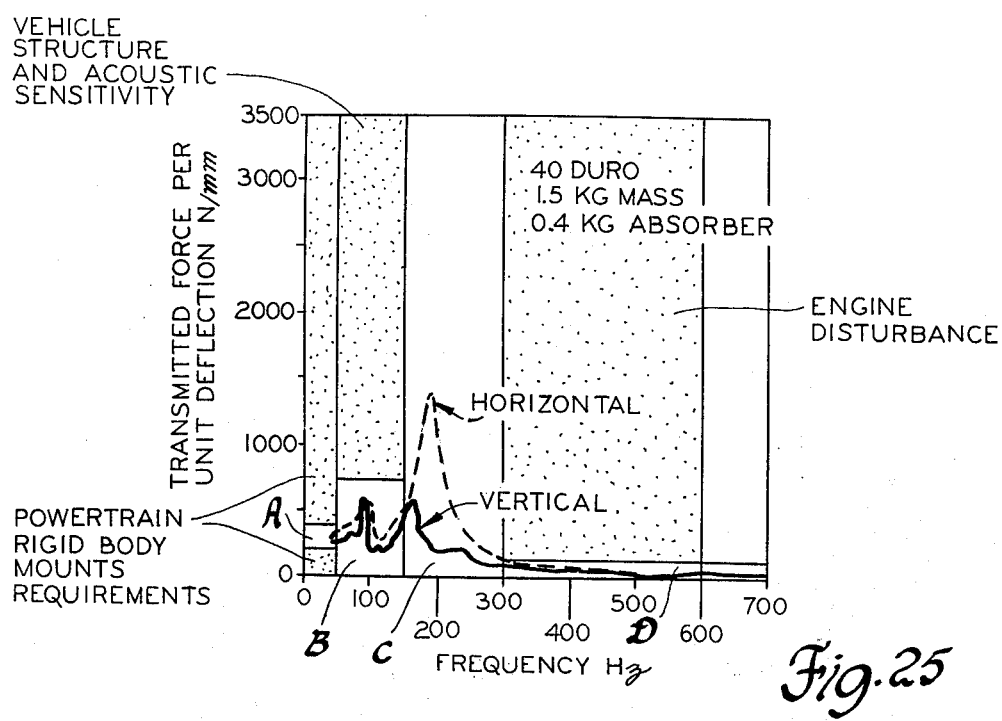

FIG. 25 is a graph showing the measured force transmissibility of an actual construction of the FIG. 7 mount having the specifications there listed.

Figure 26:
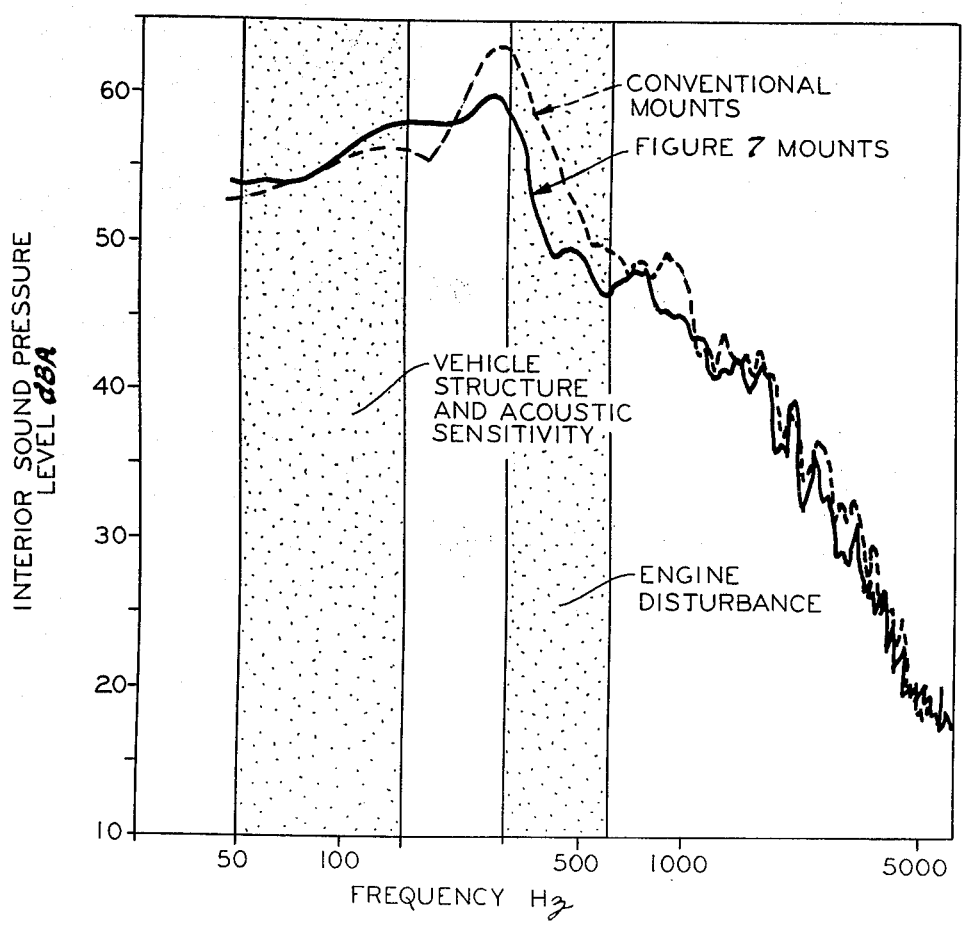

FIG. 26 is a graph showing measured passenger compartment noise level using a conventional mount and alternatively using the FIG. 7 mount with the FIG. 25 specifications.

Figure 1:
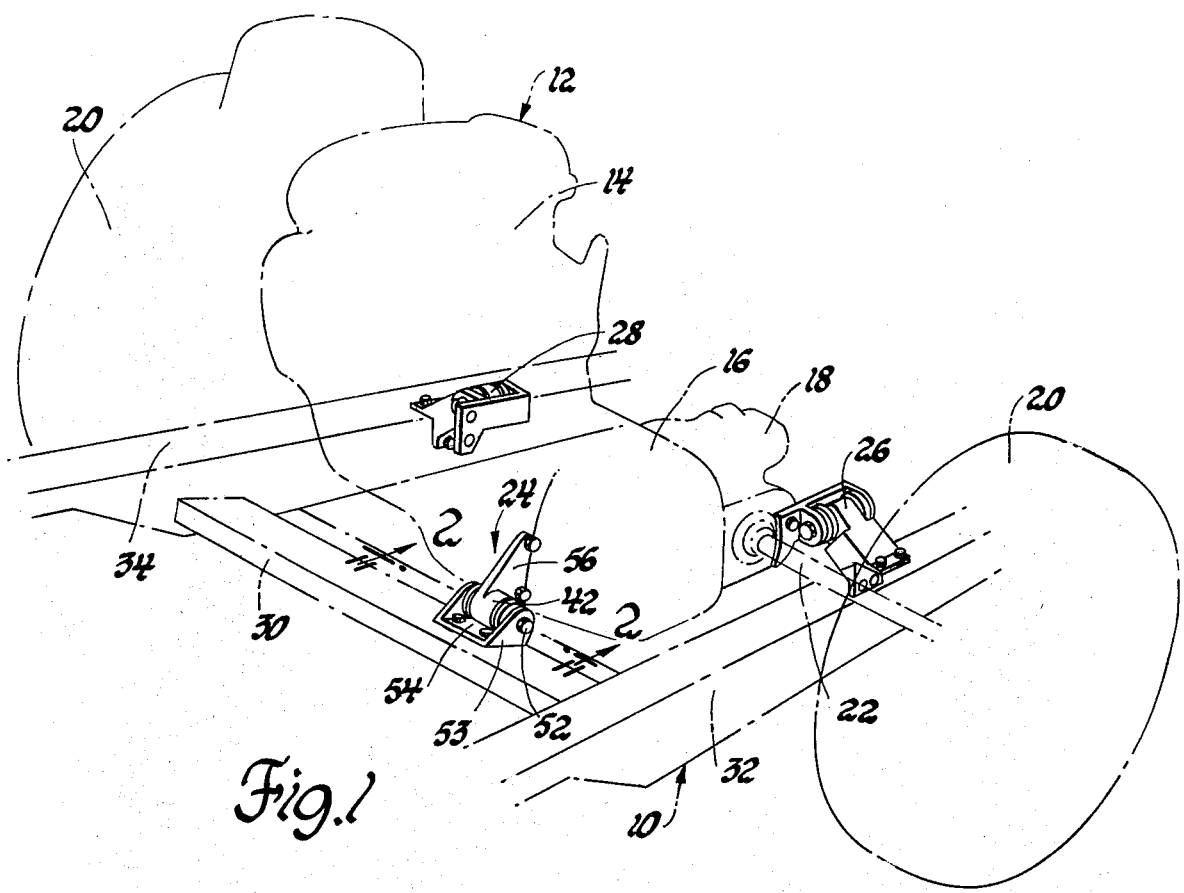
FIG. 1 is a perspective view of a front-wheel-drive vehicle having a unitized vehicle structure with an internal combustion engine mounted thereon with mounts constructed according to the present invention.

Referring to the drawings, there is shown in FIG. 1 a front-wheel-drive vehicle having an integral or unitized vehicle structure 10 on which a powertrain 12 is cushion mounted according to the present invention. To provide clear viewing of such mounting, certain details of the powertrain and vehicle parts not necessary to understanding the invention are shown only partially or have been omitted entirely.

The powertrain 12 comprises a power plant provided by an internal combustion engine 14 and a drive train provided by a transmission 16 and a differential 18 which are rigidly joined together with the combustion of the transmission and differential commonly referred to as a transaxle. The engine 14 is located ahead of the differential and transversely or cross-ways of the unitized vehicle structure 10. The transmission 16 is also located transversely and is bolted to the rear end of the engine at the left side of the vehicle and selectively drivingly connects the engine to the differential in conventional manner. The differential 18 is located directly between the vehicle's front wheels 20 and is connected to drive these wheels through half-shafts 22. The powertrain is of a conventional type and therefore further description thereof apart from its cushion mounting and vibratory motion is unnecessary.

The powertrain 12 and in particular the engine 14 is suspended through a three-point mounting arrangement directly on the unitized vehicle structure 10 by a front mount 24 and two rear mounts 26 and 28; the front mount being secured to a cross-member section 30 integral with the unitized vehicle structure 10 and the rear mounts 26 and 28 being secured to longitudinally extending sections 32 and 34 also integral with the unitized vehicle structure.

In such a unitized vehicle structure, we have found that in the absence of a cushion mounted frame on which the engine would in turn be cushion mounted, vibration forces from the engine may travel through direct attaching mounts, excite the unitized vehicle structure and cause an objectionable level of noise in the passenger compartment. In our investigation, we have discovered that these vibration disturbances are not necessarily engine speed order related, but associated with the impulsive loading nature of the combustion process. These combustion impulses excite the engine and drive train resonances which in turn deflect the mounts and cause a force to be transmitted into the unitized vehicle structure. This force on the structure results in deflection thereof (e.g. panel deflection) and the associated acoustic response, i.e. noise radiation into the passenger compartment.

For example, in an actual construction of a prototype unitized vehicle structure of minimum weight with the powertrain supported directly thereon by conventional mounts (absent any isolated intermediate mass according to the present invention), an engine rapping noise was observed under driving acceleration which was clearly sensitive to the rate of fuel combustion. Tests showed the sound to be in the 300-1600 Hz range. As to the emitter (i.e. the powertrain), its combustion process could be modified to attenuate such noise but we found that current emission requirements limit, if not prevent, the ability to do so. Alternatively, the response of the receiver (i.e. the unitized vehicle structure) could be modified to attenuate such noise, however, this would normally require substantial additional body mass which would detract from the weight saving gains of this type structure.

We found then that this leaves only the transmission path (i.e. the mounts). To further aid in understanding the problems as they relate thereto, it is helpful to know that the typical conventional mount (absent any isolated intermediate mass according to the present invention) have the characteristic as produced by their elastomeric coupling of a simple spring with the result that a powertrain deflection imposed on the powertrain side thereof produces a force on the opposite or vehicle structure side which is independent of the frequency of imposed excitation and dependent on the stiffness of the elastomer. We have demonstrated this with simple dynamic testing means comprising a shaker and loading mass coupled with a preload arrangement. With the typical conventional mount at its normally loaded condition, the transmitted force per unit deflection was determined by then measuring the lineal accelerations of the input and output sides of the mount. The measured transmitted force per unit deflection was then shown as a function of the frequency of excitation and it was found that the magnitude of the transmitted force is nearly or substantially constant and independent of the frequency and proportional to the stiffness of the elastomer. This led us to the conclusion that with such conventional amounts, the high frequency deflections of the powertrain originating from the combustion process transmit a large load into the unitized vehicle structure to produce the objectionable noise exhibited in the high frequency range above 300 Hz as earlier noted. This is believed to be typical of this type vehicle structure whether front or rear wheel drive and regardless of the number of cylinders in the engine. A mount which could somehow attenuate these high frequency force amplitudes so as to avoid having to modify either the combustion process and/or the unitized vehicle structure or add a cushion mounted engine cradle is thus highly desirable. However, it must also be recognized that apart from the desirability of the powertrain mount to attenuate the high frequency combustion originated vibration disturbances, the mount is also required to satisfy the powertrain rigid body support requirements (in this case the engine, transmission and differential) as well as the unitized vehicle structure acoustic sensitivity requirements. To illustrate these various criteria, there is produced a graph in FIG. 5 (repeated in FIGS. 6, 14 and 22-25) showing with unshaded areas what is believed to be typical of the desired force transmissibility range for various frequencies in a typical unitized vehicle structure (transmissibility, force into the unitized vehicle structure per unit of powertrain deflection, being given in N/mm covering a range of 0-3500 and frequency being given in Hz covering a range of 0-700). As can be seen in these graphs, the desired range comprises a narrow zone A encompassing static deflection in a low frequency range of 0-50 Hz which ranges from 150-250 N/mm to accommodate engine rigid body mount tuning requirements (in this case the complete power train 12). Then in a low-intermediate frequency range from 50-150 Hz the mount transmissibility as shown by a larger but still force limited zone B should not exceed 800 N/mm as it was found that higher transmissibility about this level would allow excessive vehicle structure vibration and the resulting noise because of vehicle structure resonances in the range. On the other hand, no acoustically coupled vehicle structure modes were found to exist in a relatively force unlimited zone C in a high-intermediate frequency range between 150-300 Hz so the mount transmissibility could then become very high without detrimental effects. However, in a high frequency range above 300 Hz, the mount transmissibility as shown by the zone D is required to be below 100 N/mm to reduce the combustion impulse produced noise to an acceptable level. Furthermore, it was found that these same transmissibility criteria exist to varying degree in all directions of movement of the powertrain relative to the vehicle structure, i.e. the vertical and horizontal directions.

Figure 3:
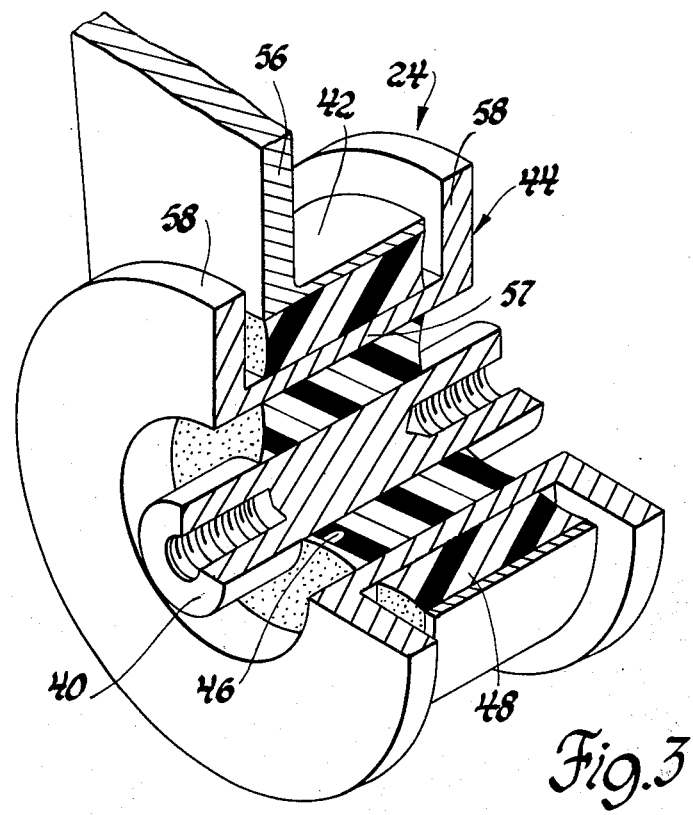
FIG. 3 is a cut-away perspective view of the mount in FIG. 2.

The powertrain mount to the present invention meets all these force transmissibility requirements and with a very simple compact arrangement and in its presently preferred form basically comprises, as shown in FIGS. 2 and 3, a centrally located vehicle-side mount member 40, an outer powertrain-side mount member 42 and an isolated or suspended intermediate member 44 which is adapted to be frequency tuned. The intermediate member 44 is elastically coupled on its inner side to the vehicle structure-side mount member 40 by an elastomeric coupling 46 and is elastically coupled on its opposite or outer side to the powertrain-side mount member 42 by an elastomeric coupling 48. The central mount member 40 is in the form of a solid cylinder which is secured at its opposite ends by bolts 52 to the arms 53 of a mounting bracket 54 which in turn is bolted or otherwise affixed to the vehicle body structure which in the case of the front mount 24 is to the cross-member section 30. The powertrain-side mount member 42, on the other hand, is in the form of a hollow cylinder or sleeve annular with the vehicle structure-side mount member 40 and in the case of the front mount 24 has an arm 56 integral therewith by which it is bolted or otherwise affixed to the front of the powertrain. The intermediate member 44 is also in the form of a hollow cylinder or sleeve 57 which is annularly arranged between the central vehicle structure-side mount member 40 and the outer powertrain-side mount member 42. The intermediate sleeve 57 has radially outwardly projecting ring-shaped collars 58 at the opposite ends thereof which remain clear of both the mounting members 40 and 42 as well as all other structure during all engine or power train deflections. The collars 58 provide means by which the mass of the intermediate member 44 can be increased or decreased to frequency tune the mount as later described without affecting the radial dimensions between it and the other mount members 40 and 42. The elastomeric couplings 46 and 48 are in the form of cylindrical rubber rings which are preloaded in place and bonded on their opposite cylindrical sides to the opposed sides of the respective mount members 40, 57 and 57, 42 so that the intermediate member 44 is completely free to vibrate in all directions against these elastic layers independent of the vehicle structure and the engine or power train during all deflections of the latter. Having described the basic construction of our new mount together with the manner in which it is connected as the front mount 24 with its centerline extending transversely of the vehicle structure, it will be understood that the two rear mounts 26 and 28 have the same basic structure but their mounting brackets differ in detail in connecting same between the vehicle structure's longitudinal side sections 32 and 34 and the power train 12 with their centerlines extending longitudinally of the vehicle structure as shown in FIG. 1. Moreover, it will be understood that the powertrain and structure side connections can be interchanged as will become apparent from the continuing detailed description.

Figure 4:
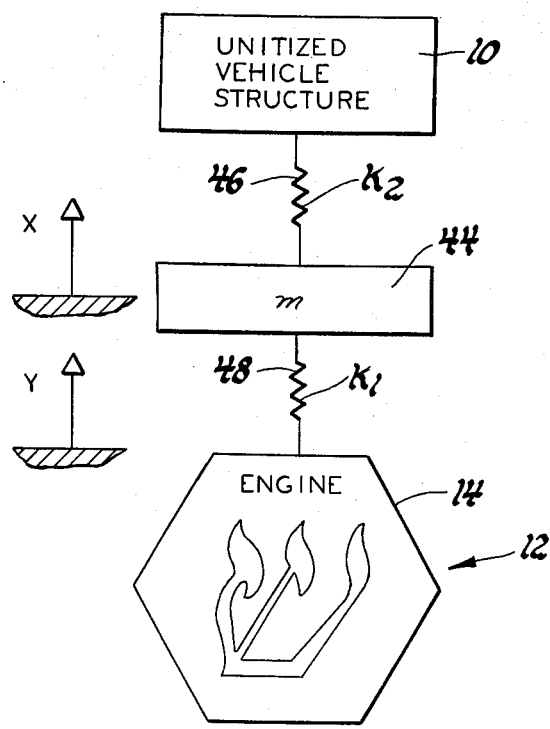
FIG. 4 is a schematic of the mounting arrangement in FIG. 1 with the FIG. 2 mount.

At this point, it will be helpful to understand the basic characteristics of our new mount construction as we will eventually show that certain predetermination of the isolated intermediate mass in combination with the deflection characteristics of the elastomeric couplings provides the desired or acceptable force transmissibility throughout the entire powertrain vibration frequency range. With the powertrain 12 supported on the unitized vehicle structure 10 by the three mounts 24, 26 and 28 of the present invention, there results the schematic system shown in FIG. 4 neglecting for now the damping effect in the elastomeric bodies 48 and 46 which thus can be approximated as simple springs having spring rates (i.e., force per unit deflection) identified as $K_1$ and $K_2$, respectively.

With the isolated intermediate member 44 having a mass m, the differential equation of motion becomes:

$$m\ddot{x} + (K_1 + K_2)x = K_1 y \qquad \text{Eq. (1)}$$

Using the method of complex algebra, we then let:

$$y = Ye^{i\omega t}, \quad x = Xe^{i(\omega t - \phi)} = Xe^{-i\phi}e^{i\omega t} \qquad \text{Eq. (2)}$$

Where:
X and Y are amplitudes
$\omega$ is frequency
t is time
$\phi$ is phase angle Substituting these into the differential equation, we obtain:

$$(-m\omega^2 + (K_1 + K_2))Xe^{-i\phi} = K_1 Y \qquad \text{Eq. (3)}$$

which may be rearranged to:

$$\left(1 - \frac{m\omega^2}{K_1 + K_2}\right) Xe^{-i\phi} = \frac{K_1}{K_1 + K_2} Y \qquad \text{Eq. (4)}$$

This may be written as:

$$\left(1 - \left(\frac{\omega}{\omega\eta}\right)^2\right) Xe^{-i\phi} = \frac{K_1}{K_1 + K_2} Y \qquad \text{Eq. (5)}$$

where we have defined the natural frequency of the isolated intermediate mass as:

$$\omega\eta = \sqrt{\frac{K_1 + K_2}{m}} \qquad \text{Eq. (6)}$$

The amplitude ratio is:

$$\frac{Xe^{-i\phi}}{Y} = \frac{K_1}{K_1 + K_2} \cdot \frac{1}{1 - \left(\frac{\omega}{\omega\eta}\right)^2} \qquad \text{Eq. (7)}$$

The absolute value of the amplitude ratio is then:

$$\left|\frac{X}{Y}\right| = \frac{K_1}{K_1 + K_2} \cdot \frac{1}{\left|\left(1 - \left(\frac{\omega}{\omega\eta}\right)^2\right)\right|} \qquad \text{Eq. (8)}$$

The transmitted force per unit deflection of the input excitation is:

$$F = K_2 \left|\frac{X}{Y}\right| \qquad \text{Eq. (9)}$$

or substituting we get:

$$F = \frac{K_1 \cdot K_2}{K_1 + K_2} \cdot \frac{1}{\left|\left(1 - \left(\frac{\omega}{\omega\eta}\right)^2\right)\right|} \qquad \text{Eq. (10)}$$

We can define the effective spring rate of the mount as:

$$Keff = \frac{K_1 \cdot K_2}{K_1 + K_2} \qquad \text{Eq. (11)}$$

and now obtain:

$$F = Keff \frac{1}{\left|\left(1 - \left(\frac{\omega}{\omega\eta}\right)^2\right)\right|} \qquad \text{Eq. (12)}$$

An examination of this expression indicates that at low frequency ratios, the transmitted force per unit deflection is approximately equal to the effective spring rate of the mount. At frequency ratios larger than the $\sqrt{2}$, a reduction in the transmitted force per unit deflection is obtained.

According to the present invention, the mass of the isolated intermediate member 44 is predetermined in combination with the elastomeric characteristics of the elastic couplings 46 and 48 to achieve the desired transmissibility and particularly the attenuation of the high frequency combustion impulse produced noise. This is accomplished by the suspended intermediate mass being predetermined in so as to resonate in the acoustically uncoupled vehicle structure frequency range such that above this range in the combustion disturbance range, there is effected attenuated or reduced force transmission by the mounts while still satisfying the engine rigid body frequencies as well as the vehicle structure and acoustic sensitivity range requirements.

For example, the above expressions for the static and dynamic characteristics can be used to define the required physical parameters of a specific application of our mount. The following procedure can then be used assuming the static rate of the mount is given:

1. Determine the allowable transmitted force per unit deflection at the lower frequency of the objectionable frequency range caused by combustion.
2. Calculate the required natural frequency of the isolated mass to achieve the reduced transmissibility.
3. Calculate the amount of mass required to achieve this resonant frequency in the stiffest mount direction.
4. Calculate the resonant frequencies in the remaining mount directions with this inserted mass.
5. Calculate the transmitted force per unit deflection of these mount directions at the lower frequency of the objectionable frequency range.

The resonant frequency of the inserted mass was defined as:

$$\omega\eta = \sqrt{\frac{K_1 + K_2}{m}} \qquad \text{Eq. (6)}$$

To achieve a specified frequency with the minimum amount of mass, requires that the summation of the spring rates $K_1$ and $K_2$ be minimized. An inspection of the expression for the effective spring rate $$Keff = \frac{K_1 \cdot K_2}{K_1 + K_2} \qquad \text{Eq. (11)}$$

indicates that for a given effective spring rate, this objective can be obtained when the spring rates $K_1$ and $K_2$ are equal. However, this objective is not mandatory to the operation of the mount.

Previously we defined the transmitted force per unit deflection of the mount(s) as:

$$F = Keff \frac{1}{\left|\left(1 - \left(\frac{\omega}{\omega\eta}\right)^2\right)\right|} \qquad \text{Eq. (12)}$$

For frequencies greater than the resonant frequency of the mass, this expression can be written $$F = \frac{-Keff}{1 - \left(\frac{\omega}{\omega\eta}\right)^2} \qquad \text{Eq. (13)}$$

Rearranging, an expression for the natural frequency of the mass can be obtained $$\omega\eta = \frac{\omega}{\sqrt{1 + \frac{K_{eff}}{F}}} \qquad \text{Eq. (14)}$$

Utilizing the expression Eq. (6), the amount of mass required to obtain the desired natural frequency can be written:

$$m = \frac{K_1 + K_2}{(2\pi f\eta)^2} \qquad \text{Eq. (15)}$$

where:

$$\omega\eta + 2\pi f\eta$$

Figure 5:
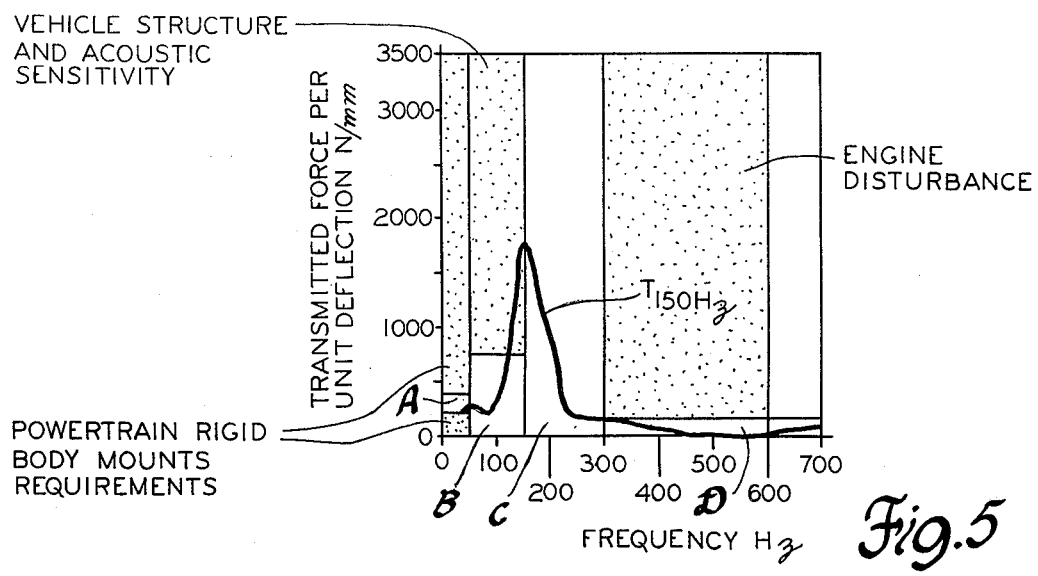
FIG. 5 is a graph showing one example of the predicted nominal force transmissibility characteristics of the mounting arrangement in FIG. 1 with the FIG. 2 mount.

Turning to the exemplary transmissibility criteria in FIG. 5 we let, for example:

$K^c$=300 KN/M, compressive spring rate (Keff)
$K_1{}^c$=$K_2{}^c$=600 KN/M
$K^s$=200 KN/M, shear spring rate (Keff)
$K_1{}^s$=$K_2{}^s$=400 KN/M
f=300 Hz, lower objectionable frequency
F=100 KN/M, allowable transmitted force per unit deflection at lower objectionable frequency From Eq. (14) the required natural frequency of the mass in the compression direction can be found:

$$f\eta^c = \frac{f}{\sqrt{1 + \frac{K^c}{F}}} = \frac{300}{\sqrt{1 + \frac{300K}{100K}}} = 150 \text{ Hz}$$

From Eq. (15) the required amount of mass can be determined $$m = \frac{K_1{}^c + K_2{}^c}{(2\pi f\eta^c)^2} = \frac{600K + 600K}{(2 \cdot 150\pi)^2} = 1.35 \text{ Kg}$$

From Eq. (6) the resultant natural frequency $fn^s$ in the shear direction can be obtained $$f\eta^s = \frac{1}{2\pi}\sqrt{\frac{K_1{}^s + K_2{}^s}{m}} = \frac{1}{2\pi}\sqrt{\frac{400K + 400K}{1.35}} = 122.5 \text{ Hz}$$

From Eq. (13) the resultant transmitted force per unit deflection in the shear direction $F^s$ can be determined $$F^s = \frac{-K^s}{1 - \left(\frac{f}{f\eta^s}\right)^2} = \frac{-200K}{1 - \left(\frac{300}{122.5}\right)^2} = 40K \cdot N/M$$

Referring to FIG. 5, there is shown the resulting transmissibility curve $T_{150\,Hz}$ (isolator mass natural frequency of 150 Hz) over the entire frequency range. It can be seen that the transmissibility curve $T_{150\,Hz}$ passes through all the desired ranges A, B, C and D with both the engine disturbance transmissibility above 300 Hz as well as the powertrain rigid body transmissibility range below 50 Hz clearly avoided but there is some undesired transmission in the acoustically sensitive 100-150 Hz range where there is transition into the uncoupled 150-300 Hz range. Such unavoidance can be acceptable where the noise disturbance from the combustion impulses in the high frequency range (above 300 Hz in the example) is the predominant criteria. On the other hand, where some combustion impulse generated noise early in the high frequency range is acceptable, it is possible to fall within the desired transmissibility zones throughout the lower frequency ranges and particularly the low-intermediate frequency acoustic sensitivity range while substantially satisfying the high frequency range by placing the isolator resonance at a higher frequency, e.g. 200 Hz. This is shown by the resulting transmissibility curve $T_{200}$ Hz in FIG. 6 wherein the same transmissibility criteria as in FIG. 5 appears.

Figure 8:
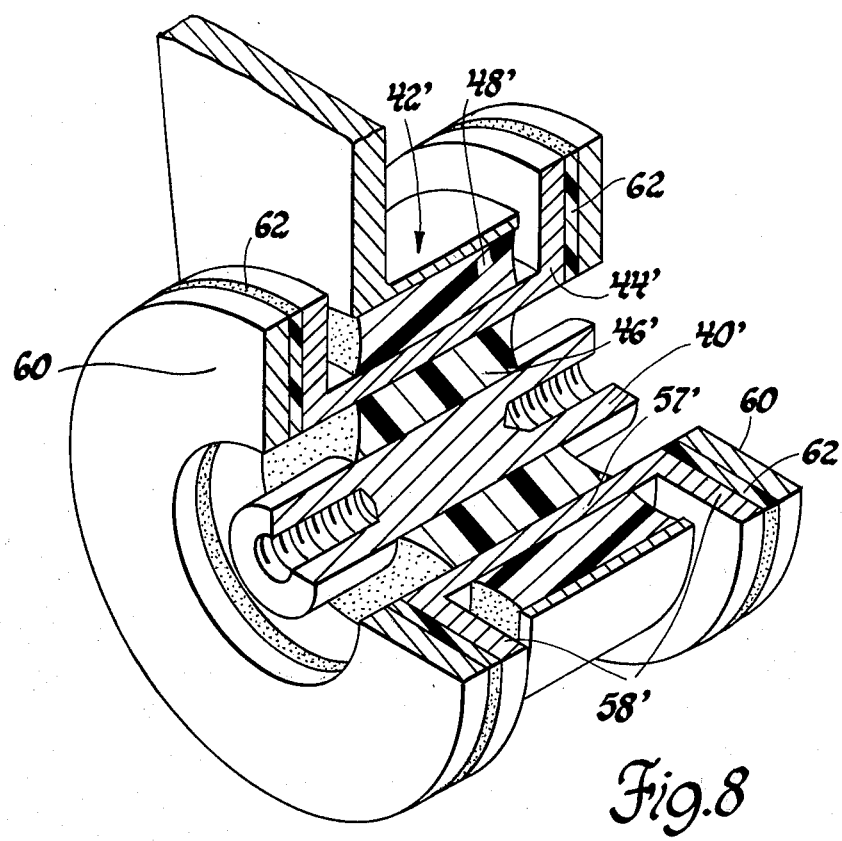
FIG. 8 is a cut-away perspective view of the mount in FIG. 7.

But it has also been found possible to fully meet all the desired transmissibility criteria with a modification of the basic mount in FIG. 2 by providing the intermediate member with a vibration absorber as shown in FIGS. 7 and 8 wherein parts similar to those in FIG. 2 are identified by the same reference numbers only primed and additional parts are identified with new reference numbers. In the FIG. 7 mount embodiment, as in the FIG. 2 mount embodiment, there is provided a central vehicle structure-side mount 40', an outer engine or powertrain-side mount 42', an intermediate suspended member 44' and elastomeric couplings 46' ($K_1$) and 48' ($K_3$) with the intermediate member remaining free to vibrate against the elastomeric layers with their resulting parallel rate of $K_1 + K_3$ (see FIG. 9). However, a portion of the suspended mass is now elastically coupled with respect to the remaining mass as provided by absorber members 60 which are suspended on the opposite ends of the intermediate member 44' through elastomeric couplings 62. Both the absorber members 60 and the elastomeric couplings 62 are in the form of rings with the latter bonded on their outer side to the respective absorber ring and on their inner side to the outer side of the respective collar 58. The resulting vibration absorber 60, 62 reduces the magnitude of the transmitted force at resonance while still attenuating the high frequency powertrain vibrations. The resulting powertrain mount system is shown schematically in FIG. 9 with the damping characteristic in force per unit velocity in all the elastomeric bodies now also considered for a more comprehensive understanding of our new mount.

Figure 9:
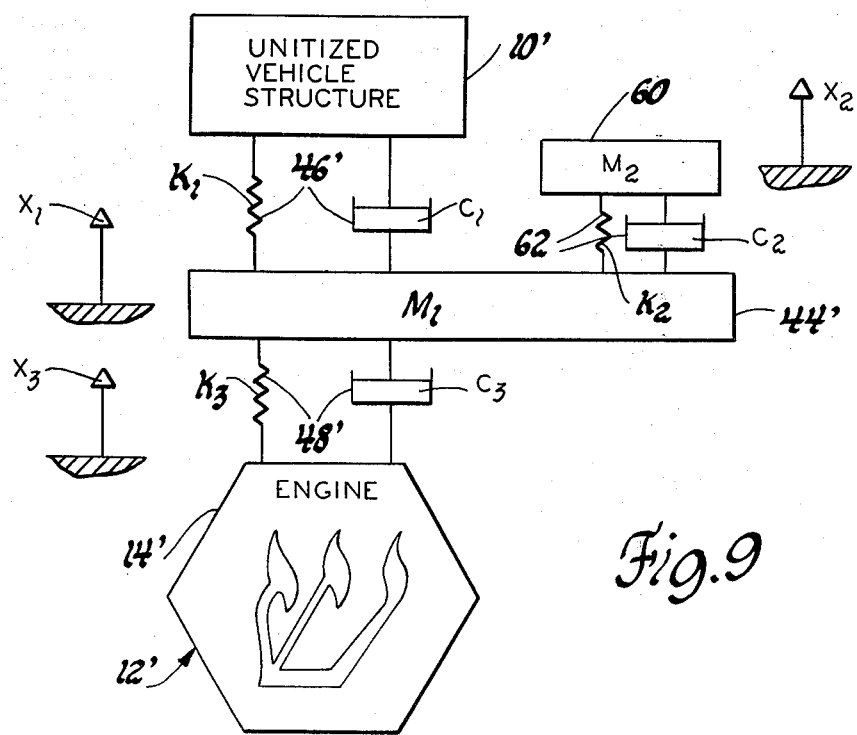
FIG. 9 is a schematic of the mounting arrangement in FIG. 1 but with the FIG. 7 mount.
Figure 10:
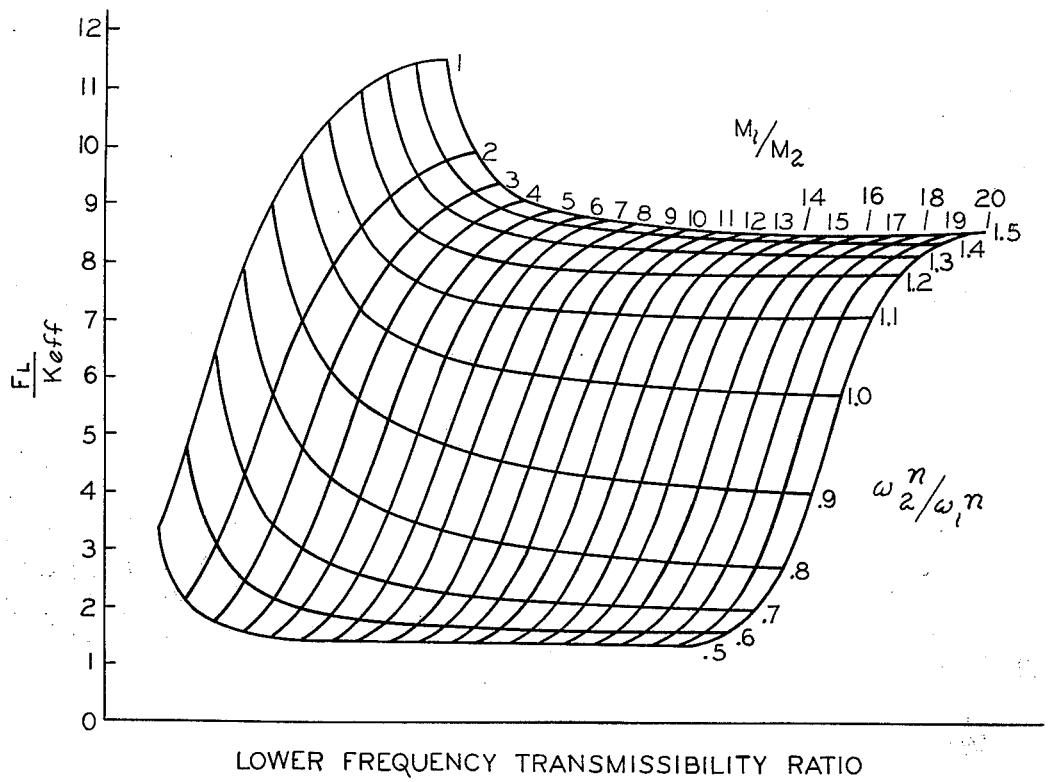
Figure 11:
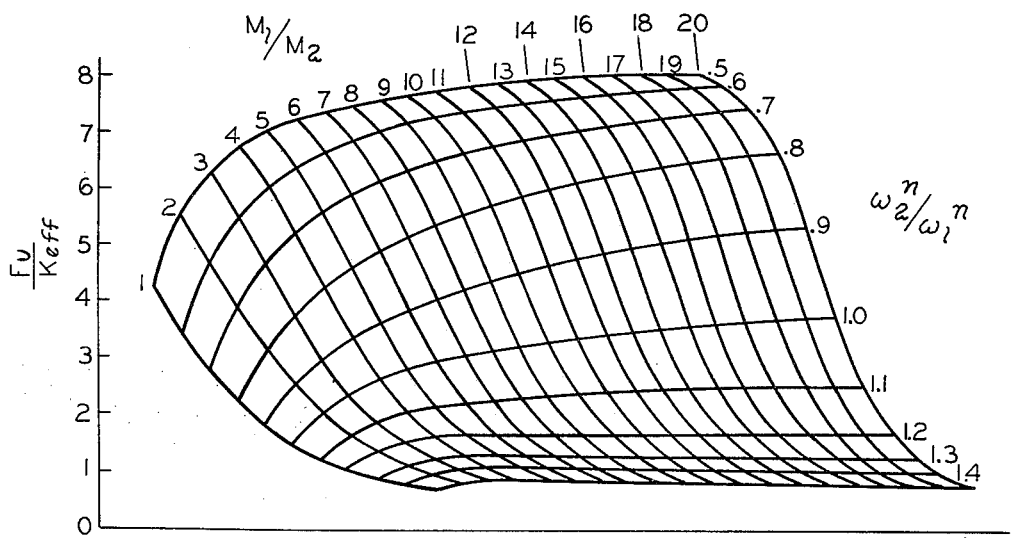

Referring to FIG. 9, the differential equations of motion are:

$$M_1\ddot{X}_1 + (C_1 + C_2 + C_3)\dot{X}_1 + (K_1 + K_2 + K_3)X_1 - \qquad \text{Eq. (16)}$$
$$C_2\dot{X}_2 - K_2X_2 = C_3\dot{X}_3 + K_3X_3$$

$$M_2\ddot{X}_2 + C_2\dot{X}_2 + K_2X_2 - C_2\dot{X}_1 - K_2X_1 = 0 \qquad \text{Eq. (17)}$$

Using the method of complex algebra, we let:

$$X_1 = X_1 e^{i(\omega t - \phi_1)} = X_1 e^{-i\phi_1} e^{i\omega t} \qquad \text{Eq. (18)}$$
$$X_2 = X_2 e^{i(\omega t - \phi_2)} = X_2 e^{-i\phi_2} e^{i\omega t}$$
$$X_3 = X_3 e^{i\omega t}$$

and obtain:

Eq. (19)

$$\{-M_1\omega^2 + i(C_1 + C_2 + C_3)\omega + (K_1 + K_2 + K_3)\}X_1 e^{-i\phi_1} -$$

-continued $$\{iC_2\omega + K_2\}X_2 e^{-i\phi_2} = \{iC_3\omega + K_3\}X_3 \quad \text{Eq. (20)}$$

$$\{-M_2\omega^2 + iC_2\omega + K_2\}X_2 e^{-i\phi_2} - \{iC_2\omega + K_2\}X_1 e^{-i\phi_1} = 0$$

Rearranging Eq. (20)

$$X_2 = \frac{\{K_2 + iC_2\omega\}}{\{K_2 - M_2\omega^2 + iC_2\omega\}} \frac{e^{-i\phi_1}}{e^{-i\phi_2}} X_1 \quad \text{Eq. (21)}$$

Substituting into Eq. (20) and solving for the amplitude ratio, we obtain:

$$\frac{X_1}{X_3} e^{-i\phi_1} = \frac{\{(K_2 - M_2\omega^2)K_3 - C_2C_3\omega^2\} + i\omega\{C_2K_3 + (K_2 - M_2\omega^2)C_3\}}{\{(K_1 + K_3 - M_1\omega^2)(K_2 - M_2\omega^2) - M_2K_2\omega^2 - C_2(C_1 + C_3)\omega^2\} +} \quad \text{Eq. (22)}$$

$$i\omega\{C_2(K_1 + K_3 - M_1\omega^2 - M_2\omega^2) + (C_1 + C_3)(K_2 - M_2\omega^2)\}$$

Utilizing the relationship for the magnitude of a complex quotient:

$$\left|\frac{a + ib}{c + id}\right| = \sqrt{\frac{a^2 + b^2}{c^2 + d^2}} \quad \text{Eq. (23)}$$

we can obtain the associated expression for the amplitude of the suspended mass with respect to the input displacement. This expression can be then used to compute the transmitted force per unit deflection of the mount.

$$F = \left|\frac{X_1}{X_3}\right|\{K_1 + i\omega C_1\} \quad \text{Eq. (24)}$$

Because of the complexity of this expression, it is difficult to resolve into a non-dimensional form. However, parametric studies can be conducted by programming the expressions on a computer as will be shown later. However, substantial insight can be obtained by utilizing the following definitions:

The effective spring rate of the mount:

$$K_{eff} = \frac{K_1 \cdot K_3}{K_1 + K_3} \quad \text{Eq. (11)}$$

The effective damping rate of the mount:

$$C_{eff} = \frac{C_1 \cdot C_3}{C_1 + C_3} \quad \text{Eq. (25)}$$

The natural frequency of the mount mass:

$$\omega_1^\eta = \sqrt{\frac{K_1 + K_3}{M_1}} \quad \text{Eq. (26)}$$

The critical damping value of the mount mass $$C_1^c = 2M_1\omega_1^\eta \quad \text{Eq. (27)}$$

The natural frequency of the vibration absorber mass:

$$\omega_2^\eta = \sqrt{\frac{K_2}{M_2}} \quad \text{Eq. (28)}$$

The critical damping value of the vibration absorber mass:

$$C_2^c = 2M_2\omega_2^{\eta_2} \quad \text{Eq. (29)}$$

The actual resonant frequencies of the masses will vary with those defined in Eq. (26) and Eq. (28). They can be determined by solving for the roots of the characteristic equation.

$$\{M_1M_2\}\omega^4 - \{(K_1 + K_2 + K_3)M_2 + K_2M_1\}\omega^2 + K_2(K_1 + K_3) = 0 \quad \text{Eq. (30)}$$

Utilizing the expressions derived above for the transmissibility of the FIG. 7 mount with its vibration absorber, parametric studies can be made defining the performance of the mount. The dependent variables of importance are the peak transmitted force per unit deflection at the lower and upper resonant frequencies and the value of the upper and lower frequencies.

A typical program and example calculation follows:

PROGRAM

```
MTYMNT
10 PRINT "THINK METRIC!!! KG,MM,N,N/MM,N-SEC/MM"
100 PRINT"INPUT INTERMEDIATE MASS, FREQ, % DAMP, KINPUT/KOUTPUT RATIO"
110 INPUT M0,F1,Z0,R1
120 LET P1=3.14159
130 LET W0=2*P1*F1
140 LET K=M0*W0*W0
150 LET K1=K/(1+R1)
160 LET K3=K-K1
170 LET C=Z0/100*2*M0*W0
180 LET C1=C/(1+R1)
190 LET C3=C-C1
200 PRINT
210 PRINT "MOUNT SPRING RATES N/MM"
220 PRINT "KINPUT =";K3/1000,"KOUTPUT =";K1/1000
225 PRINT "EFFECTIVE RATE =";K1*K3/K/1000
230 PRINT "MOUNT DAMPING RATES N-SEC/MM"
240 PRINT "CINPUT =";C3/1000,"COUTPUT =";C1/1000
```

-continued
PROGRAM

```
250 PRINT
260 PRINT"INPUT ABSORBER MASS RATIO, FREQ RATIO, % DAMP"
270 INPUT R3,R2,Z2
272 LET M1=M0
274 LET W1=SQR(K/M1)
280 LET W2=W1*R2
282 LET M2=R3*M1
290 LET K2=M2*W2*W2
300 LET C2=Z2/100*2*M2*W2
310 PRINT
312 PRINT "ABSORBER MASS =";M2;"KG"
314 PRINT
316 PRINT "ABSORBER TUNED FREQ =";W2/2/P1
320 PRINT "ABSORBER SPRING AND DAMPING RATES"
330 PRINT"K2 =";K2/1000;"N/MM   C2 =";C2/1000;"N-SEC/MM"
340 PRINT
350 PRINT "INPUT FREQ MIN, STEP, FREQ MAX"
360 INPUT F3,F4,F5
370 PRINT
380 PRINT"FREQ","X0/X3 ORIG","X1/X3 ABSB","N/MM ORIG","N/MM ABSB"
390 FOR H=F3 TO F5 STEP F4
400 LET W=H*P1*2
410 LET A=(K2−M2*W*W)*K3−C2*C3*W*W
420 LET B=W*(C2*K3+C3*(K2−M2*W*W))
430 LET C=(K1+K3−M1*W*W)*(K2−M2*W*W)−M2*K2*W*W−C2*(C1+C3)*W*W
440 LET D=W*C2*(K1+K3−(M1+M2)*W*W)+W*(C1+C3)*(K2−M2*W*W)
450 LET R=SQR((A*A+B*B)/(C*C+D*D))
460 LET A0=K3
470 LET B0=C3*W
480 LET C0=K1+K3−M0*W*W
490 LET D0=(C1+C3)*W
500 LET R0=SQR((A0*A0+B0*B0)/(C0*C0+D0*D0))
510 LET F=R*SQR(K1*K1+C1*C1*W*W)/1000
530 LET F0=R0*SQR(K1*K1+C1*C1*W*W)/1000
580 PRINT H,R0,R,F0,F
590 NEXT H
600 GO TO 250
999 END
```

EXAMPLE CALCULATION

MTYMNT   18 OCT 79   09:02

THINK METRIC!!! KG,MM,N,N/MM,N-SEC/MM
INPUT INTERMEDIATE MASS, FREQ, % DAMP, KINPUT/KOUTPUT RATIO
? 1.35,122.5,6,1

MOUNT SPRING RATES N/MM
KINPUT = 399.885                KOUTPUT = 399.885
EFFECTIVE RATE = 199.942
MOUNT DAMPING RATES N-SEC/MM
CINPUT = 6.23449E-2              COUTPUT = 6.23449E-2

INPUT ABSORBER MASS RATIO, FREQ RATIO, % DAMP
? .333,.784,6

ABSORBER MASS = 0.44955 KG

ABSORBER TUNED FREQ = 96.04
ABSORBER SPRING AND DAMPING RATES
K2 = 163.697 N/MM   C2 = 0.032553 N-SEC/MM

INPUT FREQ MIN, STEP, FREQ MAX
? 50,5,350

| FREQ | X0/X3 ORIG | X1/X3 ABSB | N/MM ORIG | N/MM ABSB |
|---|---|---|---|---|
| 50  | 0.599635 | 0.659424 | 240.072 | 264.01  |
| 55  | 0.625724 | 0.71409  | 250.581 | 285.968 |
| 60  | 0.656982 | 0.791031 | 263.171 | 316.867 |
| 65  | 0.694629 | 0.907063 | 278.334 | 363.455 |
| 70  | 0.74034  | 1.10195  | 196.746 | 441.688 |
| 75  | 0.796474 | 1.48719  | 319.356 | 596.308 |
| 80  | 0.866444 | 2.24699  | 347.54  | 901.294 |
| 85  | 0.955355 | 1.51665  | 383.354 | 608.584 |
| 90  | 1.07116  | 0.59389  | 430.003 | 238.409 |
| 95  | 1.22687  | 0.296475 | 492.725 | 119.068 |
| 100 | 1.44492  | 0.288562 | 580.568 | 115.944 |
| 105 | 1.76645  | 0.380919 | 710.103 | 153.128 |

-continued
EXAMPLE CALCULATION

| | | | | |
|---|---|---|---|---|
| 110 | 2.26909 | 0.494597 | 912.628 | 198.927 |
| 115 | 3.07467 | 0.623727 | 1237.29 | 250.997 |
| 120 | 4.05024 | 0.778491 | 1630.78 | 313.45 |
| 125 | 3.89873 | 0.975558 | 1570.69 | 393.025 |
| 130 | 2.81138 | 1.23577 | 1133.31 | 498.158 |
| 135 | 2.00152 | 1.56575 | 807.347 | 631.569 |
| 140 | 1.50454 | 1.87675 | 607.273 | 757.51 |
| 145 | 1.18691 | 1.92182 | 479.39 | 776.22 |
| 150 | 0.970847 | 1.65784 | 392.396 | 670.062 |
| 155 | 0.815849 | 1.38281 | 329.985 | 539.078 |
| 160 | 0.699865 | 1.07182 | 283.282 | 433.837 |
| 165 | 0.610131 | 0.880241 | 247.149 | 356.563 |
| 170 | 0.538827 | 0.739481 | 218.436 | 299.78 |
| 175 | 0.48092 | 0.633598 | 195.118 | 257.062 |
| 180 | 0.433042 | 0.551796 | 175.838 | 224.059 |
| 185 | 0.392852 | 0.487023 | 159.654 | 197.925 |
| 190 | 0.358682 | 0.434624 | 145.895 | 176.784 |
| 195 | 0.329307 | 0.391451 | 134.066 | 159.366 |
| 200 | 0.303813 | 0.355319 | 123.8 | 144.788 |
| 205 | 0.281499 | 0.324671 | 114.815 | 132.423 |
| 210 | 0.261825 | 0.298372 | 106.892 | 121.813 |
| 215 | 0.244364 | 0.275576 | 99.8612 | 112.616 |
| 220 | 0.228775 | 0.255642 | 93.5839 | 104.574 |
| 225 | 0.214783 | 0.238076 | 87.9499 | 97.488 |
| 230 | 0.202165 | 0.222489 | 82.8691 | 91.2001 |
| 235 | 0.190735 | 0.208573 | 78.2669 | 85.5866 |
| 240 | 0.180341 | 0.19608 | 74.0818 | 80.5474 |
| 245 | 0.170854 | 0.18481 | 70.2619 | 76.0012 |
| 250 | 0.162165 | 0.174596 | 66.7636 | 71.8814 |
| 255 | 0.154183 | 0.165301 | 63.55 | 68.1326 |
| 260 | 0.146829 | 0.156812 | 60.5892 | 64.7086 |
| 265 | 0.140036 | 0.149031 | 57.8542 | 61.5705 |
| 270 | 0.133744 | 0.141877 | 55.3213 | 58.6853 |
| 275 | 0.127904 | 0.13528 | 52.9703 | 56.0249 |
| 280 | 0.122471 | 0.12918 | 50.7832 | 53.565 |
| 285 | 0.117406 | 0.123525 | 48.7444 | 51.2848 |
| 290 | 0.112676 | 0.118271 | 46.8403 | 49.1663 |
| 295 | 0.10825 | 0.113379 | 45.0587 | 47.1936 |
| 300 | 0.104101 | 0.108813 | 43.3888 | 45.3529 |
| 305 | 0.100206 | 0.104545 | 41.8212 | 43.632 |
| 310 | 9.65439E-2 | 0.100547 | 40.3473 | 42.0203 |
| 315 | 9.30953E-2 | 9.67961E-2 | 38.9594 | 40.5082 |
| 320 | 8.98435E-2 | 9.32711E-2 | 37.6509 | 39.0873 |
| 325 | 8.67732E-2 | 8.99533E-2 | 36.4154 | 37.7499 |
| 330 | 8.38706E-2 | 8.68261E-2 | 35.2474 | 36.4895 |
| 335 | 8.11232E-2 | 8.30743E-2 | 34.142 | 35.2999 |
| 340 | 7.85198E-2 | 8.10847E-2 | 33.0946 | 34.1757 |
| 345 | 7.60501E-2 | 7.84448E-2 | 32.1011 | 33.1119 |
| 350 | 7.37048E-2 | 7.59438E-2 | 31.1576 | 32.1041 |

INPUT ABSORBER MASS RATIO, FREQ RATIO, % DAMP
? S
Program halted

The values for these dependent variables are depicted graphically in FIGS. 10–13. These values have been normalized to the magnitude of the effective mount stiffness and to the original resonant frequency of the FIG. 2 mount and were calculated as a function of the tuned frequency ratio of the absorber ($\omega_2\eta/\omega_1\eta$) and mass ratio ($M_1/M_2$) with an assumed value of six percent critical damping for both the intermediate mass and the absorber mass.

There will now be recalled the example of the FIG. 2 mount for a situation requiring the reduction in the transmitted force per unit deflection of the mount at all frequencies above 300 Hz. The predicted transmitted force characteristics of this mount in both the shear and compression directions are shown in FIG. 14 wherein the same transmissibility criteria as in FIG. 5 appears. Assuming that tests have been performed to establish the maximum allowable transmitted force per unit deflection within the acoustically sensitive low-intermediate frequency range of 50–150 Hz, FIGS. 10–13 can then be used to specify an acceptable absorber for this application in the FIG. 7 mount. For example, given:

$K^c = 300$ KN/M (Keff)

$K^s = 200$ KN/M (Keff)

$f^c\eta = 150$ HZ ($\omega_1{}^{72}/2\pi$)

$f^s\eta = 122.5$ HZ ($\omega_1\eta/2\pi$)

$M_1 = 1.35$ KG $F = 900$ KN/M

Figure 15:
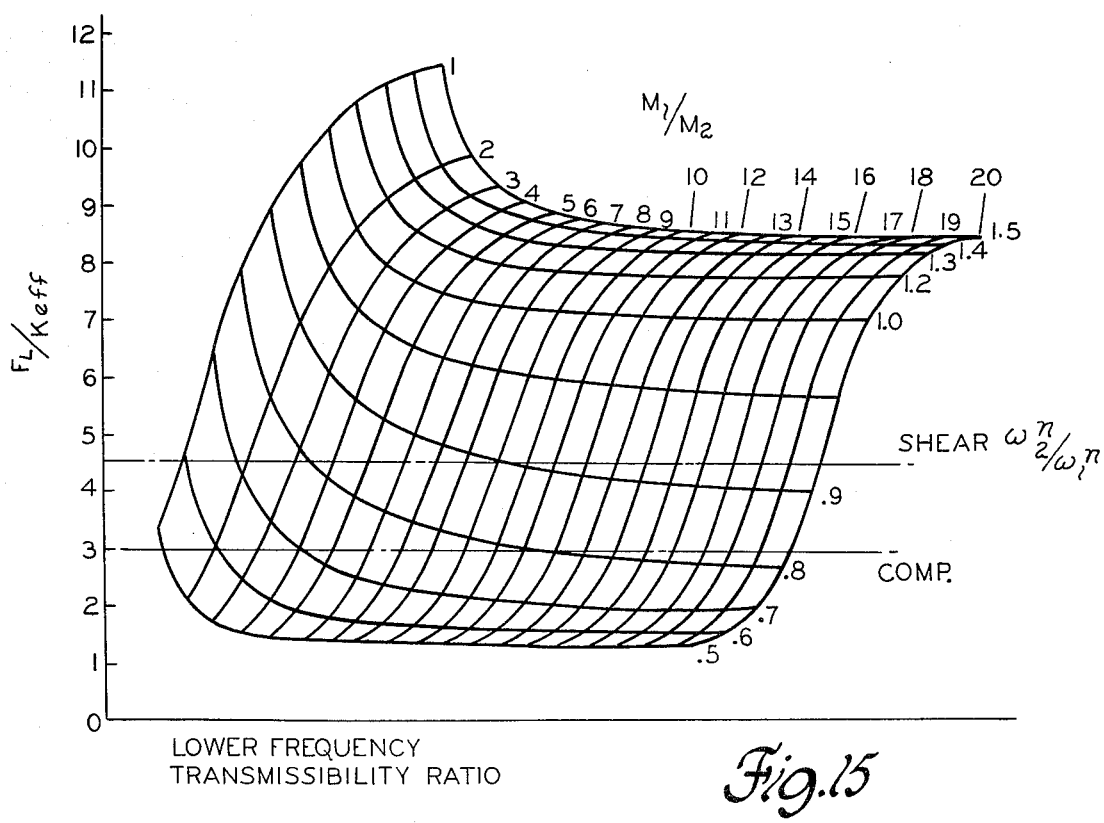

There is then performed the following procedure:

Step 1. Calculate the maximum allowable force per unit deflection amplification at the lower resonant frequency for each mount direction and locate these lines on the force -continued per unit deflection (transmissibility) ratio at the lower resonant frequency plot as shown in FIG. 15.
$F/K^c = 900/300 = 3$ (Compression Direction)
$F/K^s = 900/200 = 4.5$ (Shear Direction)

Figure 16:
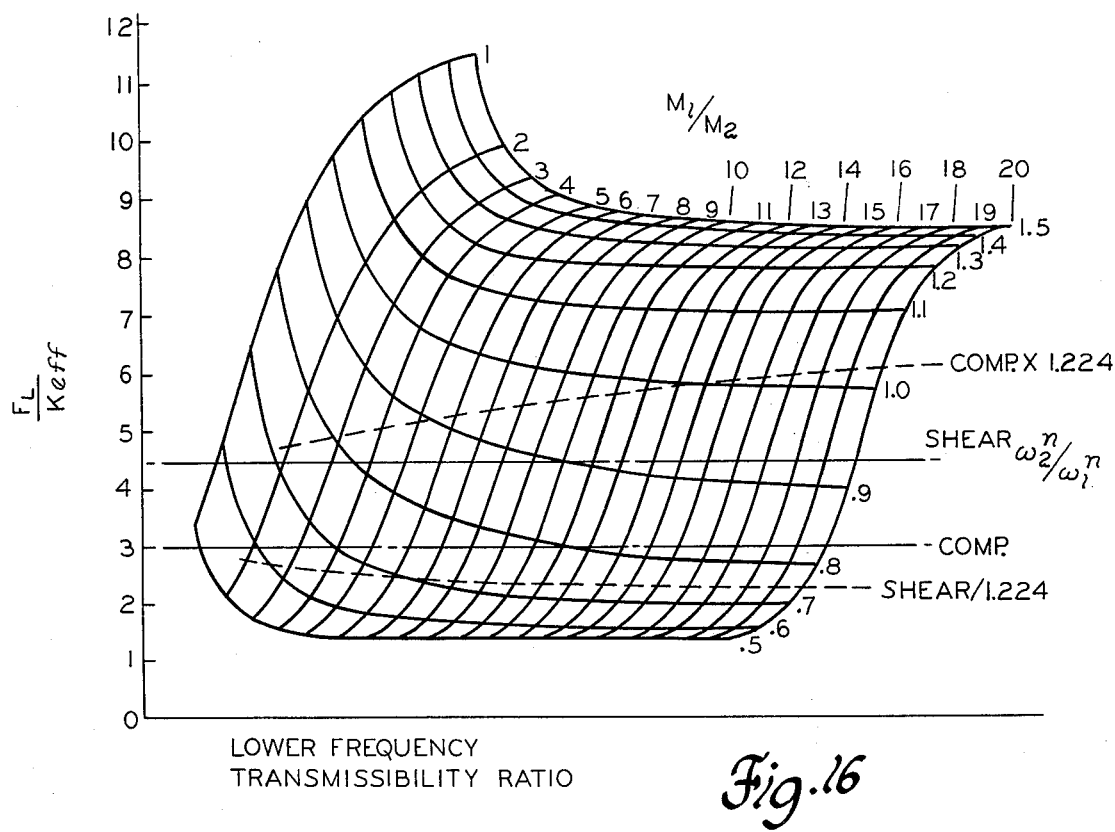

Step 2. Calculate the ratio of the intermediate mass resonant frequencies for the two directions of the mount. Assuming that the absorber mass will resonate at the same frequency in both directions, the absorber frequency to intermediate mass frequency ratio in the two directions will have the same relationship to each other as the intermediate mass frequency ratio.
$f\eta^c/f\eta^s = 150/122.5 = 1.224$
Then use this relationship to define pairs of compatible allowable force amplification lines on the plot of Step 1 as shown in FIG. 16. As can be seen, the lines of constant force per unit deflection ratio amplification intersect lines of constant mass ratio. For the associated frequency ratio, then calculate the corresponding value of the other frequency ratio. $\omega_2\eta/\omega_1\eta$

| $M_1/M_2$ | SHEAR | SHEAR/1.224 | COMP | COMP × 1.224 |
|---|---|---|---|---|
| 2 | .71 | .58 | .59 | .73 |
| 4 | .82 | .67 | .70 | .86 |
| 6 | .87 | .71 | .75 | .92 |
| 8 | .89 | .73 | .77 | .94 |
| 10 | .90 | .74 | .79 | .97 |
| 12 | .91 | .75 | .81 | .99 |
| 14 | .92 | .75 | .82 | 1.00 |
| 20 | .93 | .76 | .83 | 1.02 |

Figure 17:
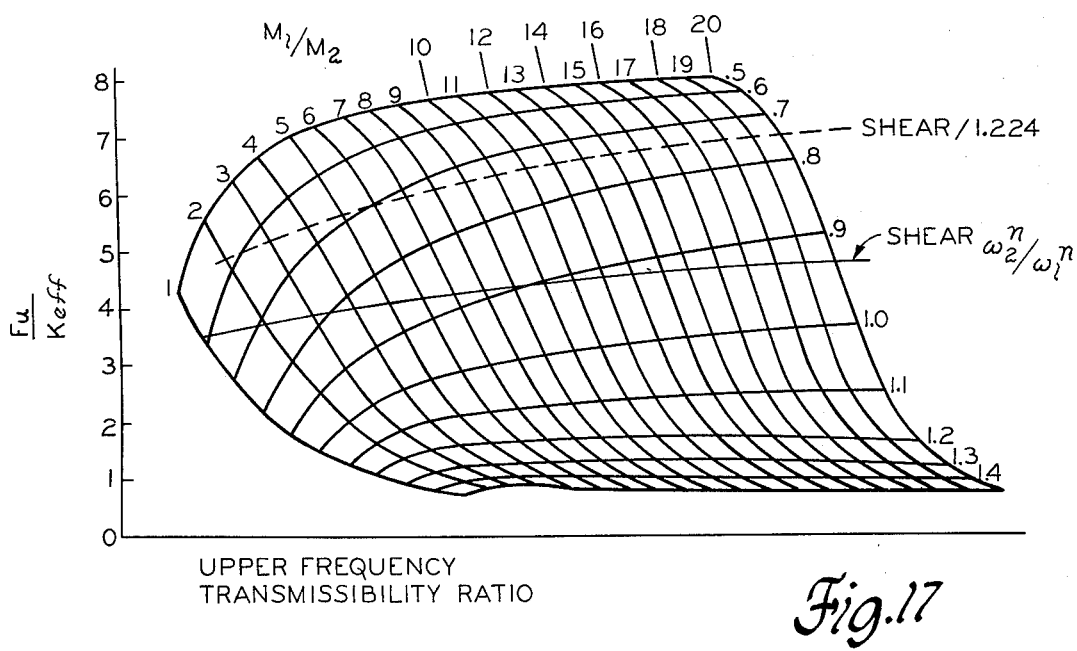
Figure 18:
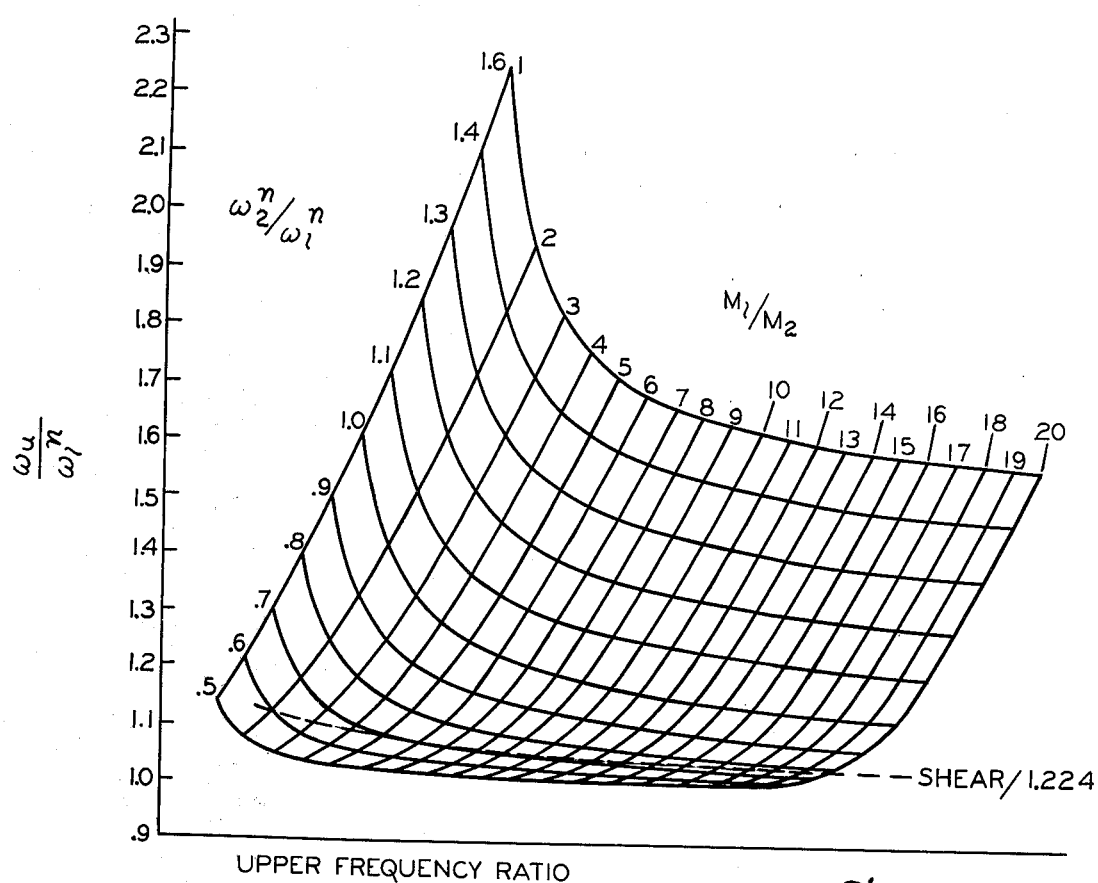
Figure 19:
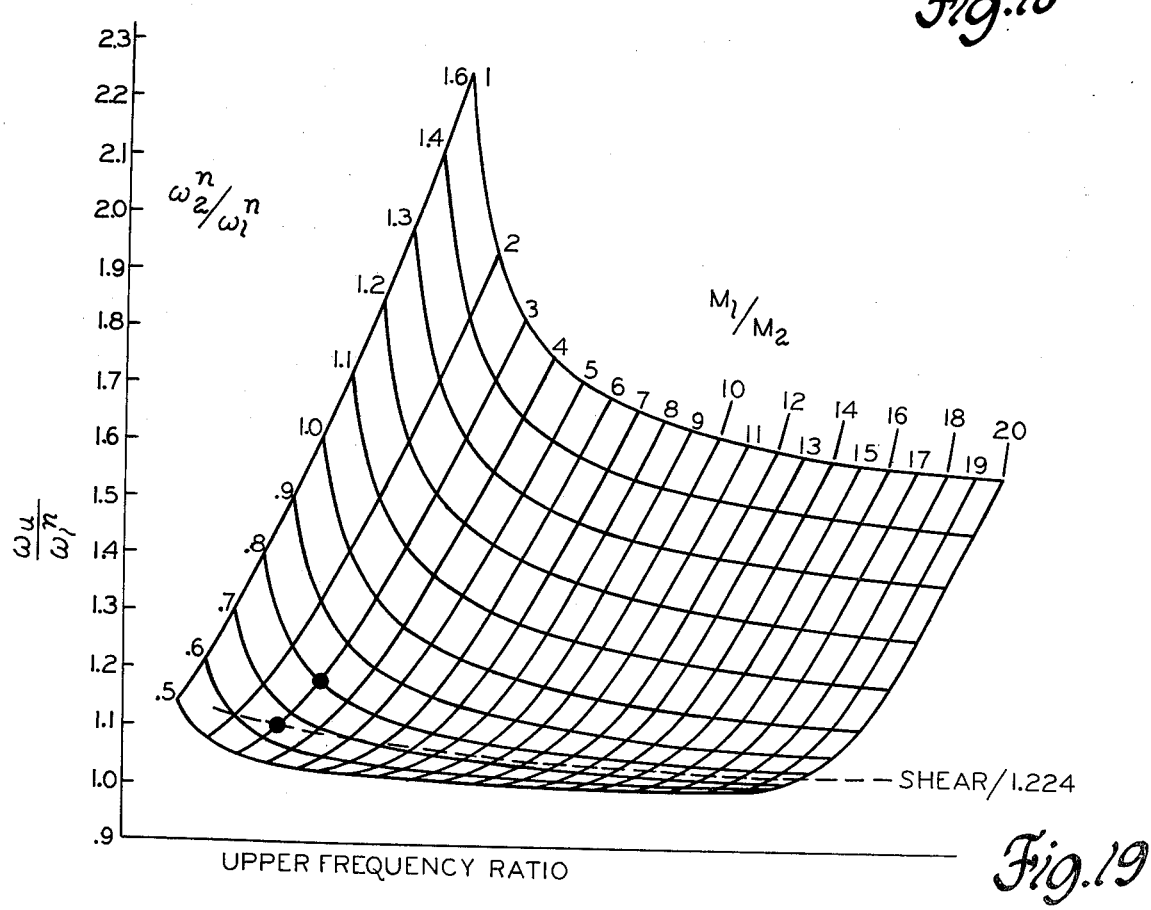

Step 3. Pick the corresponding pair of lines that satisfy both maximum force per unit deflection ratio criteria and transfer these lines to the corresponding positions on the force per unit deflection ratio at the upper resonance plot as shown in FIG. 17.
Step 4. Inspect these lines for conformity to the criteria of maximum transmitted force per unit deflection ratio established for each direction in Step 1. If both directions conform at the upper resonance too, any corresponding absorber parameters chosen along these lines will accommodate the design requirements. If these lines do not conform, choose the line that conforms the least and transfer the corresponding positions to the upper resonance Frequency Ratio plot as shown in FIG. 18.
Step 5. Since this mount direction does not conform to the maximum allowable transmitted force per unit deflection ratio at the upper resonance, it is necessary to choose a set of absorber parameters that locates the upper resonance outside of the acoustic frequency range. Locate this point on the plots in FIGS. 16–18 as shown in FIGS. 19–21 and record the values. A value of 1.1 was chosen for the frequency ratio to assure the upper frequency skirt was outside the critical frequency range.

Then letting:

|  | Comp | Shear |
|---|---|---|
| $M_1/M_2$ | 3.0 | 3.0 |
| $\omega_2\eta/\omega_1\eta$ | .64 | .784 |

Finding:

|  | | |
|---|---|---|
| $\omega u/\omega_1\eta = fu/f\eta$ | 1.10 | 1.17 |
| Fu/Keff | 5.2 | 3.95 |
| FL/Keff | 2.8 | 4.5 |
| $\omega L/\omega_1\eta = fL/f\eta$ | .585 | .645 |

And calculating:

|  | Comp | Shear |
|---|---|---|
| $\omega_2\eta/2\pi = F_2$ | 96 HZ | 96 HZ |
| $\omega L/2\pi = fL$ | 88 HZ | 79 HZ |
| $\omega u/2\pi = fu$ | 165 HZ | 143 HZ |
| Fu | 1560 KN/MM | 790 KN/mm |
| FL | 840 KN/MM | 900 KN/mm |

To check the validity of these design parameters, the predicted response of this mount can be computed by using the sample program previously given. These results are shown in FIG. 22 with all the desired transmissibility criteria fully met as the transmissibility curves in compression and shear lie fully within the desired range over the entire frequency spectrum.

To further help in understanding our advance in the art as to the FIG. 7 mount, it is commonly understood that an optimum tuned and damped absorber would have both its transmissibility peaks at the two resonances at equal height and in that case the predicted results would be as shown in FIG. 23. As can be seen, to obtain a conditionally acceptable response would require elastomeric coupling material having a large damping factor of 20% which is not readily available while on the other hand, the readily obtainable 6% damping value would produce unacceptably high amplitudes.

According to the present invention, the absorber is intentionally mistuned as compared with conventional practice to reduce the lower resonance amplitude in the acoustic range B while the upper frequency resonance is made to occur in the uncoupled range C between the acoustic sensitivity range and the engine combustion disturbance higher frequency range D as shown by the solid-line curve in FIG. 24. However, it will also be understood that such tuning could also be of opposite bias as also shown by the dash-line curve in FIG. 24 dependent on the specific application and the acceptable limits of transmissibility with the tuning of the absorber then to the higher frequency ratio to reduce the upper resonance amplitude to a desired level with a corresponding acceptable increase in the lower resonance amplitude.

In the prototype vehicle in which we tested, we achieved the actual results shown in FIG. 25 with FIG. 7 mounts whose elastomeric couplings had a 40 durometer and the suspended mass totalled 1.5 kg with 0.4 kg used as the absorber (the solid-line curve representing the transmissibility in the vertical direction, and the dash line representing that in the horizontal direction). As can be seen, the lower resonance in the mount in the vehicle structure and acoustic sensitive range B is limited to about 700 N/mm transmitted force per unit deflection while the upper resonance occurs below the engine disturbance frequency range. In the vertical direction, an attenuation is achieved for frequencies above 200 Hz while attenuation is achieved for frequencies above 250 Hz in the horizontal direction. Furthermore, it was demonstrated in the prototype vehicle that our mount eliminated the engine generated noise without any detrimental effects. FIG. 26 shows the noise scan conducted and it can be seen that the measured interior noise level in the passenger compartment indicates substantial reduction of noise in the 300–600 Hz band as compared with a conventional mount having no suspended mass therein.

The embodiments of the invention in which an exclusive property or privilege is claimed are defined as follows:

1. In a mounting arrangement for mounting a vibratory body on a supporting structure wherein the acceptable transmission of vibratory forces from the vibratory body to the supporting structure imposes a low level limit of transmissibility in a low frequency range, a high level limit of transmissibility in an intermediate frequency range, and a lowest level limit of transmissibility in a high frequency range: an improved mount comprising an intermediate mass independent of the supporting structure and vibratory body and adapted to be frequency tuned, first elastomeric coupling means for coupling said intermediate mass and the supporting structure, second elastomeric coupling means for coupling said intermediate mass and the vibratory body, an absorber mass independent of the supporting structure and vibratory body and intermediate mass and adapted to be frequency tuned, third elastomeric coupling means for coupling said absorber mass and intermediate mass, and said intermediate mass and absorber mass predetermined in combination with the elastomeric characteristics of all said coupling means so that said intermediate mass has upper and lower resonances of predetermined substantially different force transmissibility amplitude situated within the intermediate frequency range such that the force transmissibility of said mount is attenuated to below the lowest level throughout the high frequency range while also remaining below the other transmissibility level limits throughout their respective frequency range.

2. In a mounting arrangement for mounting a powertrain in a unitized vehicle structure wherein the acceptable transmission of vibratory forces from the powertrain to the unitized vehicle structure imposes a low level limit of transmissibility in a low frequency range, permits a relatively unlimited level of transmissibility in an intermediate frequency range and imposes a lowest level limit of transmissibility in a high frequency range: an improved powertrain mount comprising an intermediate means independent of the unitized vehicle structure and powertrain and adapted to be frequency tuned, first elastomeric coupling means for coupling said intermediate means and the unitized vehicle structure, second elastomeric coupling means for coupling said intermediate means and the powertrain, said intermediate means having a mass predetermined in combination with the elastomeric characteristics of said first and second coupling means so as to have resonant frequency characteristics within the intermediate frequency range such that the force transmissibility of said powertrain mount is attenuated to below the lowest level substantially throughout the high frequency range while also remaining below the other transmissibility level limits substantially throughout their respective frequency range, said intermediate means further including a second mass adapted to be frequency tuned, third elastic coupling means for coupling said second mass and the first-mentioned mass, and both said masses predetermined in combination with the elastomeric characteristics of all said coupling means so that the first-mentioned mass has upper and lower resonances of predetermined substantially different force transmissibility amplitude situated in the intermediate frequency range such that the force transmissibility of said powertrain mount is attenuated to below the lowest level throughout the high frequency range while also remaining below the other transmissibility level limits throughout their respective frequency range.

3. In a mounting arrangement for mounting a powertrain in a unitized vehicle structure wherein the acceptable transmission of vibratory forces from the powertrain to the unitized vehicle structure imposes a low level limit of transmissibility in a low frequency range, a larger but still limited level of transmissibility in a low-intermediate frequency range, permits a relatively unlimited level of transmissibility in a high-intermediate frequency range and imposes a lowest level limit of transmissibility in a high frequency range: an improved powertrain mount comprising an intermediate means independent of the unitized vehicle structure and powertrain and adapted to be frequency tuned, first elastomeric coupling means for coupling said intermediate means and the unitized vehicle structure, second elastomeric coupling means for coupling said intermediate means and the powertrain, said intermediate means having a mass predetermined in combination with the elastomeric characteristics of said first and second coupling means so as to have resonant frequency characteristics within the low-intermediate and high-intermediate frequency ranges such that the force transmissibility of said powertrain mount is attenuated to below the lowest level substantially throughout the high frequency range while also remaining below the other transmissibility level limits substantially throughout their respective frequency range, said intermediate means further including a second mass adapted to be frequency tuned, third elastic coupling means for coupling said second mass and the first-mentioned mass, and both said masses predetermined in combination with the elastomeric characteristics of all said coupling means so that the first-mentioned mass has an upper resonance force transmissibility amplitude situated in said high-intermediate frequency range and a lower resonance force transmissibility amplitude of predetermined substantially less magnitude situated in the low-intermediate frequency range such that the force transmissibility of said powertrain mount is attenuated to below the lowest level throughout the high frequency range while also remaining below the other transmissibility level limits throughout their respective frequency range.

* * * * *

UNITED STATES PATENT AND TRADEMARK OFFICE
CERTIFICATE OF CORRECTION

PATENT NO. : 4,403,762

DATED : September 13, 1983

INVENTOR(S) : James A. Cogswell, II et al

It is certified that error appears in the above—identified patent and that said Letters Patent is hereby corrected as shown below:

Column 1, line 64, "amounts" should read -- mounts --.
Column 3, line 48, "combustion" should read -- combination --.
Column 4, line 29, after "we", insert -- have --.
Column 13, "530" should read -- 520 --.
Column 13, "196,746" should read -- 296,746 --.
Column 15, "1.38281" should read -- 1.33281 --.
Column 15, "8.03743E-2" should read -- 8.38743E-2 --.

Signed and Sealed this

Nineteenth Day of June 1984

[SEAL]

Attest:

GERALD J. MOSSINGHOFF

Attesting Officer        Commissioner of Patents and Trademarks